(12) United States Patent
Guo et al.

(10) Patent No.: US 9,154,798 B2
(45) Date of Patent: Oct. 6, 2015

(54) METHODS AND APPARATUS FOR EFFICIENT VIDEO ENCODING AND DECODING OF INTRA PREDICTION MODE

(75) Inventors: Liwei Guo, San Diego, CA (US); Peng Yin, Ithaca, NY (US); Yunfei Zheng, San Diego, CA (US); Xiaoan Lu, Princeton, NJ (US); Qian Xu, Folsom, CA (US); Joel Sole, La Jolla, CA (US)

(73) Assignee: Thomson Licensing, Issy les Moulineaux (FR)

( * ) Notice: Subject to any disclaimer, the term of this patent is extended or adjusted under 35 U.S.C. 154(b) by 670 days.

(21) Appl. No.: 13/496,052

(22) PCT Filed: Sep. 14, 2010

(86) PCT No.: PCT/US2010/002498
§ 371 (c)(1),
(2), (4) Date: Mar. 14, 2012

(87) PCT Pub. No.: WO2011/031332
PCT Pub. Date: Mar. 17, 2011

(65) Prior Publication Data
US 2012/0170652 A1    Jul. 5, 2012

Related U.S. Application Data

(60) Provisional application No. 61/242,205, filed on Sep. 14, 2009.

(51) Int. Cl.
*H04N 19/176* (2014.01)
*H04N 19/14* (2014.01)
(Continued)

(52) U.S. Cl.
CPC ............. *H04N 19/14* (2014.11); *H04N 19/11* (2014.11); *H04N 19/176* (2014.11); *H04N 19/46* (2014.11); *H04N 19/593* (2014.11); *H04N 19/61* (2014.11)

(58) Field of Classification Search
CPC ..................... H04N 19/00157; H04N 19/176
USPC ..................................... 375/240.12
See application file for complete search history.

(56) References Cited

U.S. PATENT DOCUMENTS 7,289,674 B2   10/2007  Karczewicz
8,224,100 B2   7/2012   Jeong
(Continued)

FOREIGN PATENT DOCUMENTS

CN    1795680 A     6/2006
CN    101141649 A   3/2008
(Continued)

OTHER PUBLICATIONS

Anonymous: ITU-T Rec. H.264 ISO/IEC 14496-10/Amd.3 Scalable video coding, JVT Meeting, Oct. 26, 2007, pp. 137-158.
(Continued)

*Primary Examiner* — Dave Czekaj
*Assistant Examiner* — Berteau Joisil
(74) *Attorney, Agent, or Firm* — Robert D. Shedd; Julia Tanase

(57) ABSTRACT

Methods and apparatus are provided for efficient video encoding and decoding of intra prediction mode. An apparatus includes a video encoder for encoding picture data for at least a block in a picture by determining a spatial pattern for a decoded intra prediction mode residue used to reconstruct the picture at the video encoder. The decoded intra prediction mode residue is obtained by inverse quantizing and inverse transforming a transformed and quantized difference between an original version of the block and at least one reference block. The spatial pattern is used to determine an intra prediction mode for encoding the block.

57 Claims, 18 Drawing Sheets

(51) Int. Cl.
*H04N 19/46* (2014.01)
*H04N 19/61* (2014.01)
*H04N 19/593* (2014.01)
*H04N 19/11* (2014.01)

(56) References Cited

U.S. PATENT DOCUMENTS

| | | | |
|---|---|---|---|
| 8,406,286 | B2 | 3/2013 | Liu et al. |
| 2007/0036215 | A1 | 2/2007 | Pan et al. |
| 2007/0047656 | A1* | 3/2007 | Kim et al. ............... 375/240.24 |
| 2007/0053433 | A1* | 3/2007 | Song ........................ 375/240.13 |
| 2009/0110070 | A1 | 4/2009 | Takahashi et al. |
| 2009/0268974 | A1 | 10/2009 | Takagi |

FOREIGN PATENT DOCUMENTS

| | | |
|---|---|---|
| JP | 2005529527 | 9/2005 |
| JP | 2006523073 | 10/2006 |
| JP | 2007134810 | 5/2007 |
| JP | 2007166617 | 6/2007 |
| JP | 200960153 | 3/2009 |
| JP | 2009111691 | 5/2009 |
| WO | 2004/080084 A1 | 9/2004 |
| WO | 2007/072895 A1 | 6/2007 |

OTHER PUBLICATIONS

ITU-T H.264, Mar. 2005, Advanced video coding for generic audiovisual services, Series H: Audiovisual and Multimedia Systems, 343 pgs.

Kim, et al., Multistage mode decision for intra prediction in H.264 codec, Proceedings of the international society for optical engineering, vol. 5308, No. 1, Jan. 20, 2004, pp. 355-363.

Yi, et al., Priority-based template matching intra prediction, Multimedia and expo, Jun. 23, 2008, pp. 1117-1120.

International Search Report dated Dec. 21, 2010.

* cited by examiner

METHODS AND APPARATUS FOR EFFICIENT VIDEO ENCODING AND DECODING OF INTRA PREDICTION MODE

CROSS-REFERENCE TO RELATED APPLICATIONS

This application claims the benefit of U.S. Provisional Application Ser. No. 61/242,205, filed Sep. 14, 2009, which is incorporated by reference herein in its entirety.

TECHNICAL FIELD

The present principles relate generally to video encoding and decoding and, more particularly, to methods and apparatus for efficient video encoding and decoding of intra prediction mode.

BACKGROUND

The International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard") is the first video coding standard that employs spatial directional prediction for intra coding. Spatial directional prediction for intra coding provides a more flexible prediction framework, thus the coding efficiency is greatly improved over previous standards where intra prediction was done only in the transform domain. In accordance with the MPEG-4 AVC Standard, spatial intra prediction is performed using the surrounding available samples, which are the previously reconstructed samples available at the decoder within the same slice. For luma samples, intra prediction can be done on a 4×4 block basis (denoted as Intra_4×4), an 8×8 block basis (denoted as Intra_8×8) and on a 16×16 macroblock basis (denoted as Intra_16×16). Turning to FIG. 1, MPEG-4 AVC Standard directional intra prediction with respect to a 4×4 block basis (Intra_4×4) is indicated generally by the reference numeral 100. Prediction directions are generally indicated by the reference numeral 110, image blocks are generally indicated by the reference numeral 120, and a current block is indicated by the reference numeral 130. In addition to luma prediction, a separate chroma prediction is performed. There are a total of nine prediction modes for Intra_4×4 and Intra_8×8, four modes for Intra_16×16 and four modes for the chroma component. The encoder typically selects the prediction mode that minimizes the difference between the prediction and original block to be coded. A further intra coding mode, denoted I_PCM, allows the encoder to simply bypass the prediction and transform coding processes. It allows the encoder to precisely represent the values of the samples and place an absolute limit on the number of bits that may be contained in a coded macroblock without constraining decoded image quality.

Turning to FIG. 2, labeling of prediction samples for the Intra_4×4 mode of the MPEG-4 AVC Standard is indicated generally by the reference numeral 200. FIG. 2 shows the samples (in capital letters A-M) above and to the left of the current blocks which have been previously coded and reconstructed and are therefore available at the encoder and decoder to form the prediction.

Turning to FIGS. 3B-J, Intra_4×4 luma prediction modes of the MPEG-4 AVC Standard are indicated generally by the reference numeral 300. The samples a, b, c, p of the prediction block are calculated based on the samples A-M using the Intra_4×4 luma prediction modes 300. The arrows in FIGS. 3B-J indicate the direction of prediction for each of the Intra_4×4 modes 300. The Intra_4×4 luma prediction modes 300 include modes 0-8, with mode 0 (FIG. 3B, indicated by reference numeral 310) corresponding to a vertical prediction mode, mode 1 (FIG. 3C, indicated by reference numeral 311) corresponding to a horizontal prediction mode, mode 2 (FIG. 3D, indicated by reference numeral 312) corresponding to a DC mode, mode 3 (FIG. 3E, indicated by reference numeral 313) corresponding to a diagonal down-left mode, mode 4 (FIG. 3F, indicated by reference numeral 314) corresponding to a diagonal down-right mode, mode 5 (FIG. 3G, indicated by reference numeral 315) corresponding to a vertical-right mode, mode 6 (FIG. 3H, indicated by reference numeral 316) corresponding to a horizontal-down mode, mode 7 (FIG. 3I, indicated by reference numeral 317) corresponding to a vertical-left mode, and mode 8 (FIG. 3J, indicated by reference numeral 318) corresponding to a horizontal-up mode. FIG. 3A shows the general prediction directions 330 corresponding to each of the Intra_4×4 modes 300.

In modes 3-8, the predicted samples are formed from a weighted average of the prediction samples A-M. Intra_8×8 uses basically the same concepts as the 4×4 predictions, but with a block size 8×8 and with low-pass filtering of the predictors to improve prediction performance.

Turning to FIGS. 4A-D, four Intra_16×16 modes corresponding to the MPEG-4 AVC Standard are indicated generally by the reference numeral 400. The four Intra_16×16 modes 400 includes modes 0-3, with mode 0 (FIG. 4A, indicated by reference numeral 411) corresponding to a vertical prediction mode, mode 1 (FIG. 4B, indicated by reference numeral 412) corresponding to a horizontal prediction mode, mode 2 (FIG. 4C, indicated by reference numeral 413) corresponding to a DC prediction mode, and mode 3 (FIG. 4D, indicated by reference numeral 414) corresponding to a plane prediction mode. Each 8×8 chroma component of an intra coded macroblock is predicted from previously encoded chroma samples above and/or to the left and both chroma components use the same prediction mode. The four prediction modes are very similar to the Intra_16×16, except that the numbering of the modes is different. The modes are DC (mode 0), horizontal (mode 1), vertical (mode 2) and plane (mode 3).

The choice of intra prediction mode for each 4×4/8×8/16×16 block must be signaled to the decoder and this could potentially require a large number of bits. H.264/AVC has a particular method to signal the intra mode in order to avoid the use of a large number of bits. Taken Intra_4×4 as an example, intra modes for neighboring 4×4 blocks are often correlated. To take advantage of this correlation, predictive coding is used in H.264/AVC to signal 4×4 intra modes. Turning to FIG. 5, a current block E and its neighboring blocks A, B, and C are indicated generally by the reference numeral 500. For each current block (such as block E in FIG. 5), the encoder and decoder calculate the most probable prediction mode, which is the minimum of the prediction modes of block A and block B. If either of these neighboring blocks is not available (e.g., outside the current slice or not coded in Intra4×4 mode), the corresponding mode value for the missing block (A or B) is set to 2 (DC prediction mode).

The encoder sends a flag for each 4×4 block, pre_intra4×4_pred_mode. If the flag is equal to "1", then the most probable prediction mode is used. If the flag is equal to "0", then another parameter rem_intra4×4_pred_mode is sent to indicate a change of mode.

If rem_intra4×4_pred_mode is smaller than the current most probable mode, then the prediction mode is set to rem_intra4×4_pred_mode, otherwise the prediction mode is set to (rem_intra4×4_pred_mode+1).

In this way, only eight values (0 to 7) are required to transmit the chosen rem_intra4×4_pred_mode to signal the current intra mode (0 to 8).

The signaling of Intra8×8 is the same as that of Intra4×4. The prediction mode for luma coded in Intra16×16 mode or chroma coded in intra mode is signaled in the macroblock header and predictive coding of the mode is not used in these cases.

Although the most probable mode in the MPEG-4 AVC Standard is simple to compute and reduces the number of bits required for coding the prediction modes, it is based on the spatial characteristics of the neighboring blocks, not that of the current block to be coded. As a result, it is not optimal in catching the local spatial characteristics of the current block.

How to signal intra prediction mode is fundamental to the efficiency of current video encoders for intra coding. It has been observed that intra prediction may not be able to perfectly eliminate the spatial correlation of video signals, as the decoded (reconstructed) intra prediction residues tend to exhibit some spatial pattern which is highly correlated to the selected intra prediction mode. For example, for images with vertical patterns, vertical intra prediction mode tends to be selected. We have observed that the decoded residues also have vertical patterns. As previously mentioned, this is because the vertical correlation in the original signal cannot be perfectly removed by the vertical intra prediction. However, none of the existing technologies took advantage of this correlation for intra prediction mode coding.

SUMMARY

These and other drawbacks and disadvantages of the prior art are addressed by the present principles, which are directed to methods and apparatus for efficient encoding and decoding of intra prediction mode.

According to an aspect of the present principles, there is provided an apparatus. The apparatus includes a video encoder for encoding picture data for at least a block in a picture by determining a spatial pattern for a decoded intra prediction mode residue used to reconstruct the picture at the video encoder. The decoded intra prediction mode residue is obtained by inverse quantizing and inverse transforming a transformed and quantized difference between an original version of the block and at least one reference block. The spatial pattern is used to determine an intra prediction mode for encoding the block.

According to another aspect of the present principles, there is provided a method in a video encoder. The method includes encoding picture data for at least a block in a picture by determining a spatial pattern for a decoded intra prediction mode residue used to reconstruct the picture at the video encoder. The decoded intra prediction mode residue is obtained by inverse quantizing and inverse transforming a transformed and quantized difference between an original version of the block and at least one reference block. The spatial pattern is used to determine an intra prediction mode for encoding the block.

According to yet another aspect of the present principles, there is provided an apparatus. The apparatus includes a video decoder for decoding picture data for at least a block in a picture by determining a spatial pattern for a decoded intra prediction mode residue used to reconstruct the picture at the video decoder. The decoded intra prediction mode residue is obtained by inverse quantizing and inverse transforming a transformed and quantized difference between an original version of the block and at least one reference block. The spatial pattern is used to determine an intra prediction mode for decoding the block.

According to still another aspect of the present principles, there is provided a method in a video decoder. The method includes decoding picture data for at least a block in a picture by determining a spatial pattern for a decoded intra prediction mode residue used to reconstruct the picture at the video decoder. The decoded intra prediction mode residue is obtained by inverse quantizing and inverse transforming a transformed and quantized difference between an original version of the block and at least one reference block. The spatial pattern is used to determine an intra prediction mode for decoding the block.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

Figures 3E, 3F:
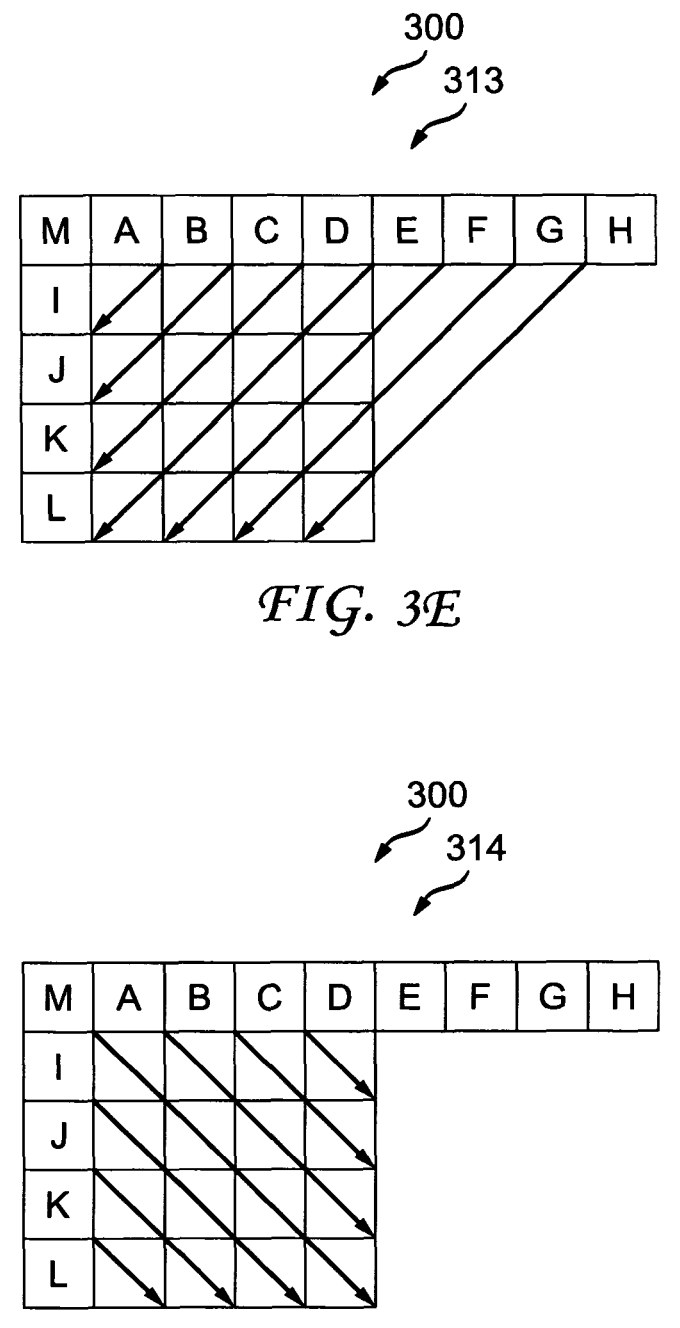

FIGS. 3A-J are diagrams respectively showing Intra_4×4 luma prediction modes of the MPEG-4 AVC Standard;

DETAILED DESCRIPTION

Figures 1, 2:
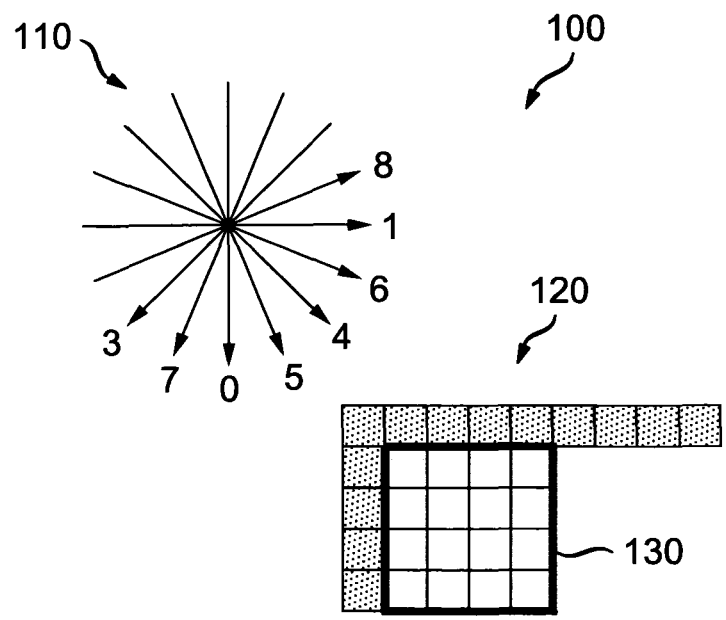
FIG. 1 is a diagram showing MPEG-4 AVC Standard directional intra prediction with respect to a 4×4 block basis (Intra_4×4)
FIG. 2 is a diagram showing labeling of prediction samples for the Intra_4×4 mode of the MPEG-4 AVC Standard.
Figure 3A:
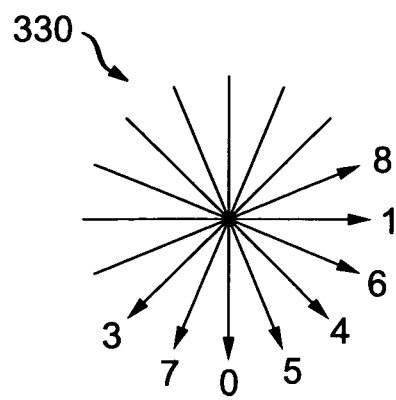
Figure 3B:
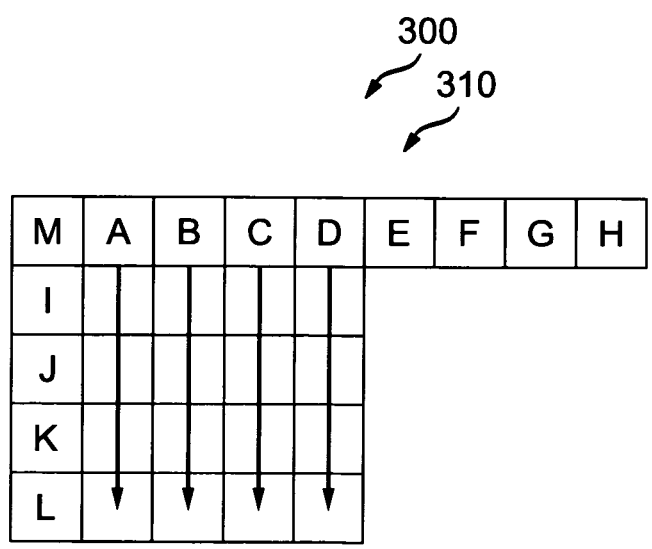
Figure 3C:
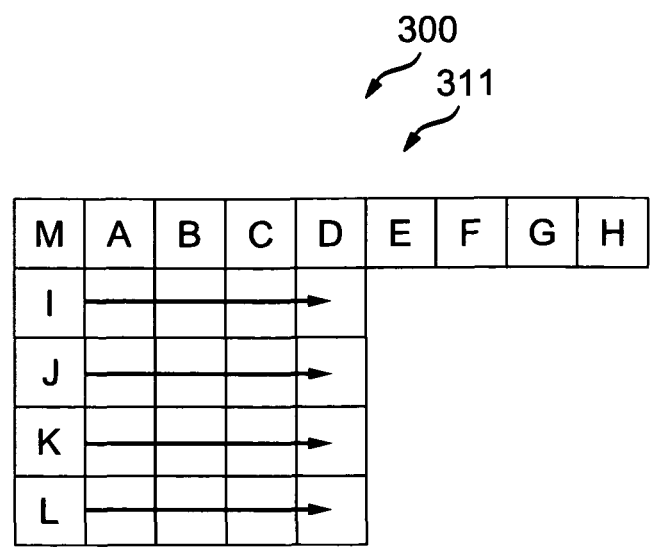
Figure 3D:
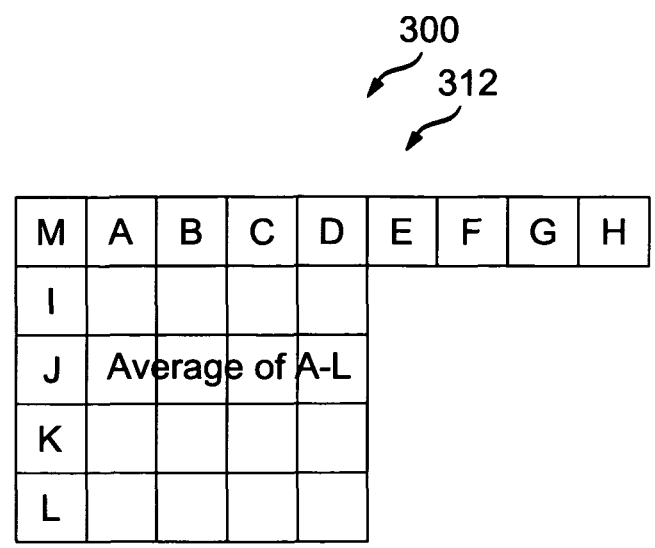
Figure 3G:
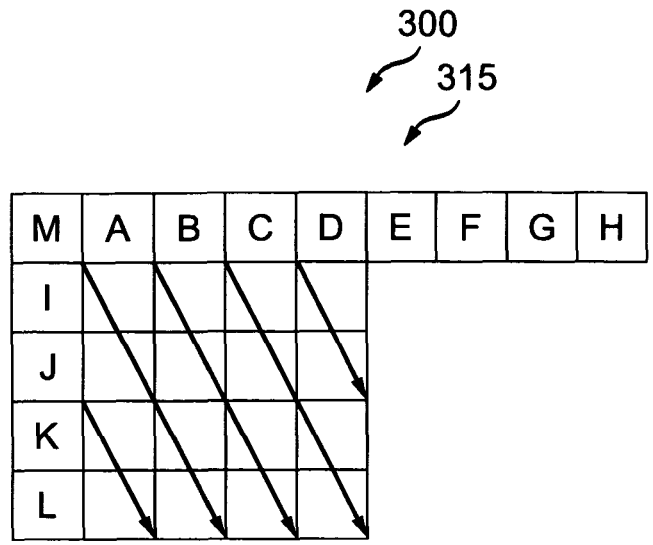
Figure 3H:
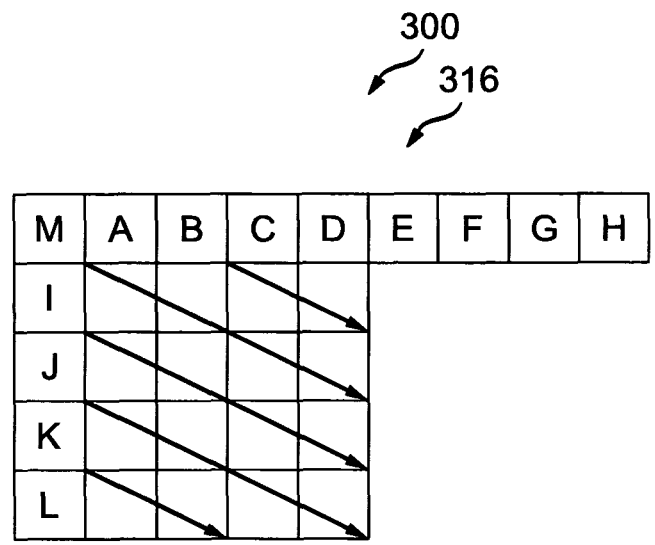
Figure 3I:
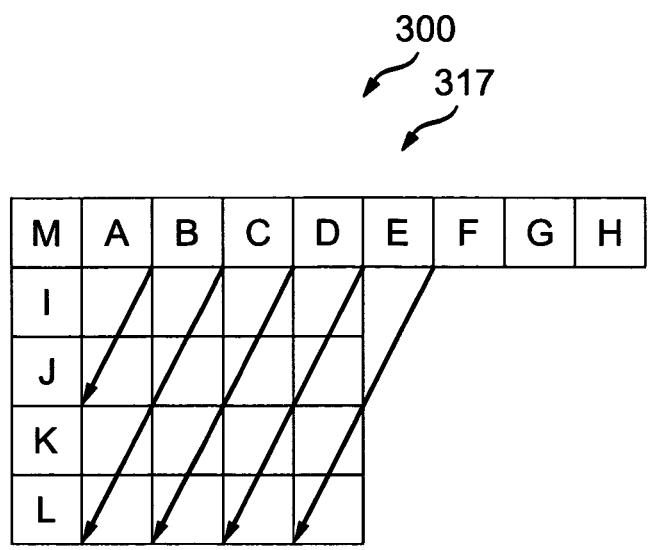
Figure 3J:
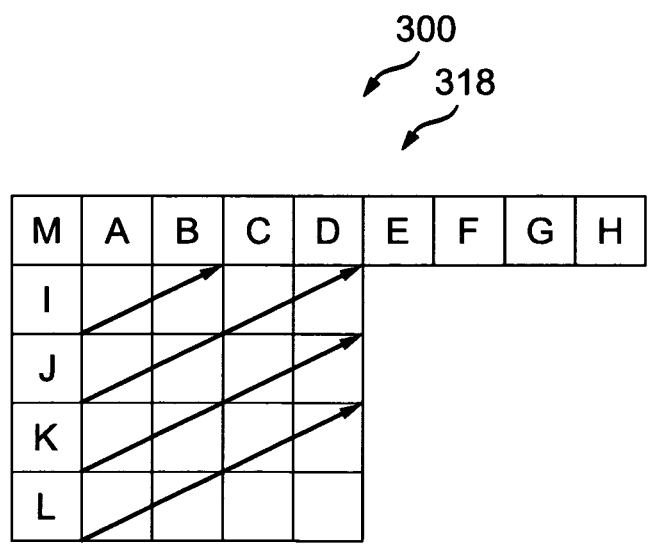
Figure 4A:
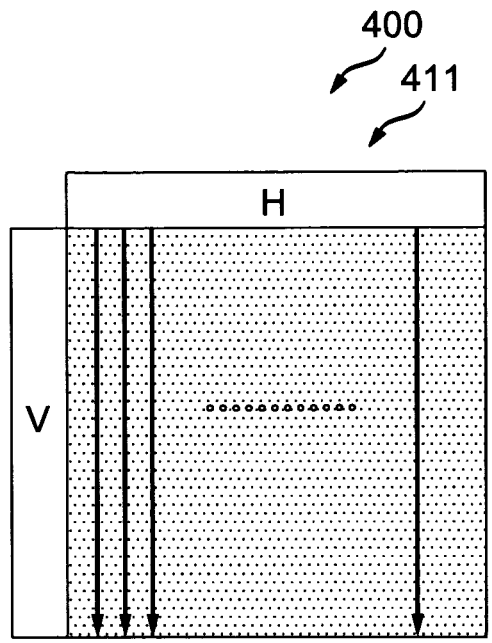
FIGS. 4A-D are diagrams respectively showing four Intra_16×16 modes corresponding to the MPEG-4 AVC Standard.
Figure 4B:
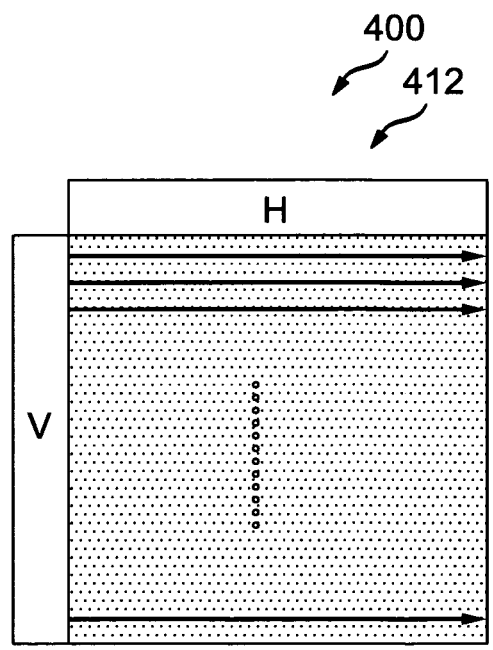
Figure 4C:
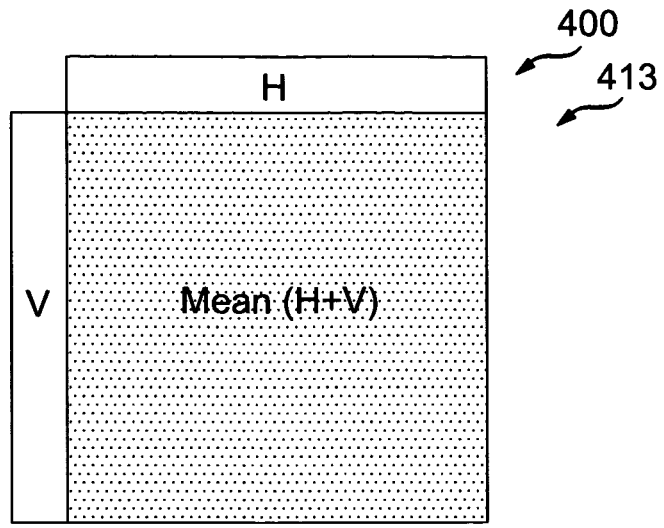
Figure 4D:
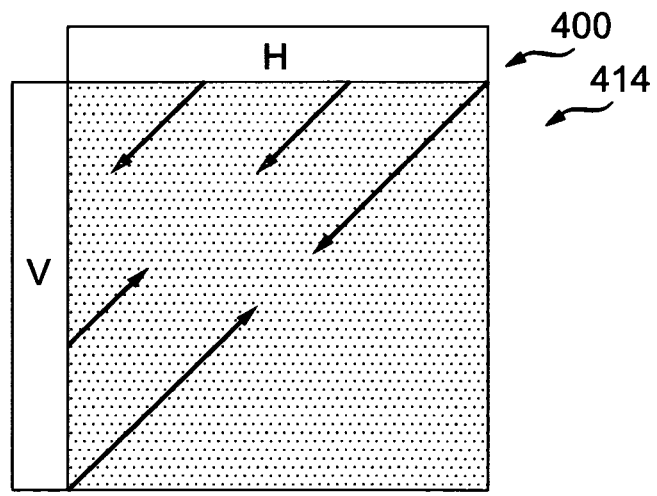
Figure 5:
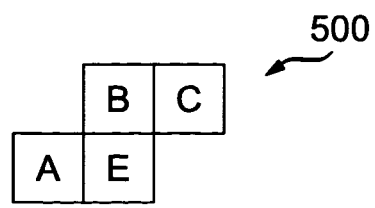
FIG. 5 is a diagram showing a current block E and its neighboring blocks A, B, and C.

The present principles are directed to methods and apparatus for efficient video encoding and decoding of intra prediction mode.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal a particular one, or set, or subset of intra coding modes in order to make the decoder aware of which particular one, or set, or subset of intra coding modes was used on the encoder side. In this way, the same, intra coding modes may be used at both the encoder side and the decoder side. Thus, for example, an encoder may transmit a particular one, or set, or subset of intra coding modes to the decoder so that the decoder may use the same particular one, or set, or subset of intra coding modes or, if the decoder already has the particular one, or set, or subset of intra coding modes as well as others, then signaling may be used (without transmitting) to simply allow the decoder to know and select the particular one, or set, or subset of intra coding modes. By avoiding transmission of any actual intra coding modes, a bit savings may be realized. It is to be appreciated that signaling may be accomplished in a variety of ways. For example, one or more syntax elements, flags, and so forth may be used to signal information to a corresponding decoder.

Moreover, it is to be appreciated that while one or more embodiments of the present principles are described herein with respect to the MPEG-4 AVC Standard, the present principles are not limited to solely this standard and, thus, may be utilized with respect to other video coding standards, recommendations, and extensions thereof, including extensions of the MPEG-4 AVC standard, while maintaining the spirit of the present principles.

Figure 6:
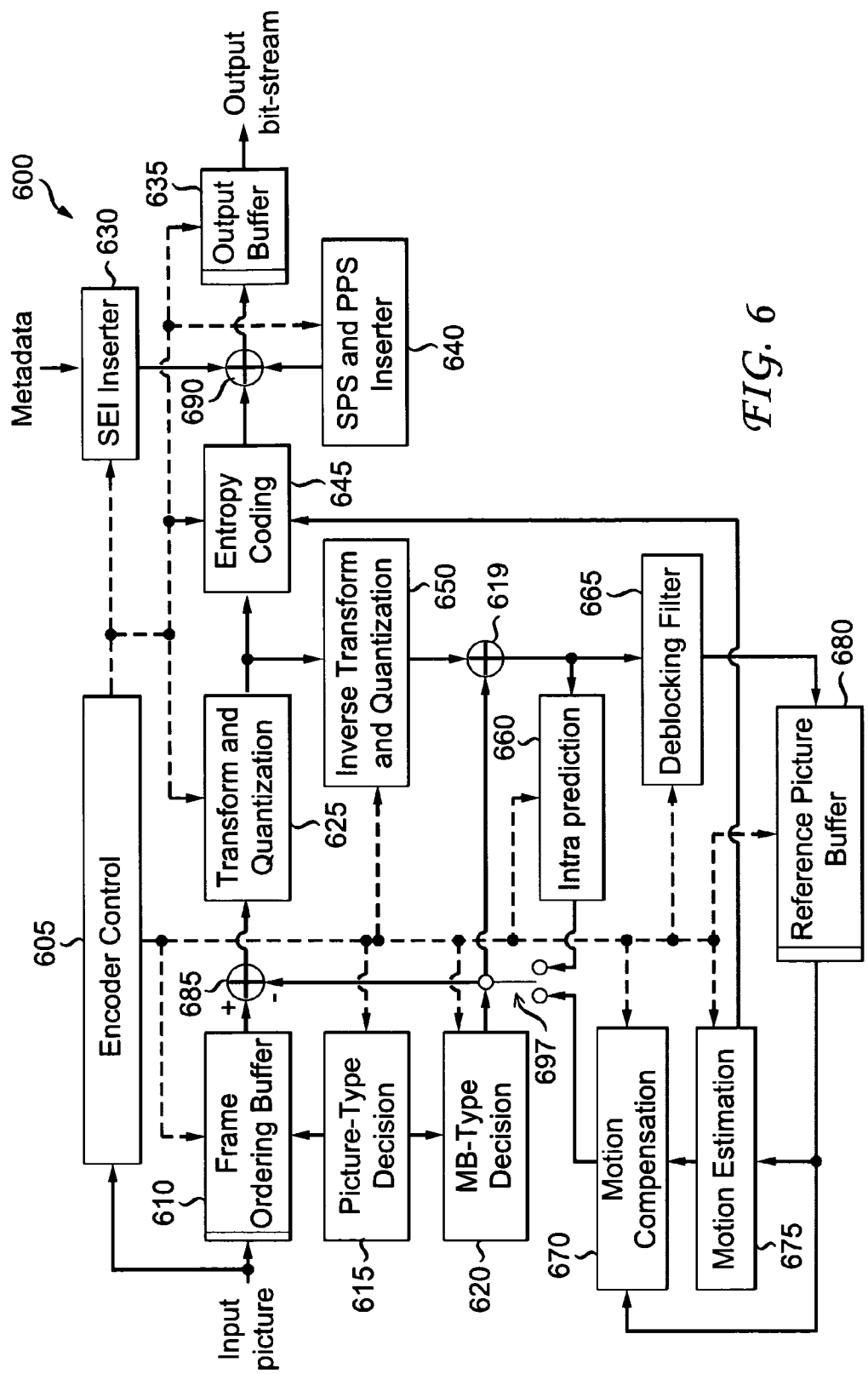
FIG. 6 is a block diagram showing an exemplary video encoder to which the present principles may be applied, in accordance with an embodiment of the present principles.

Turning to FIG. 6, an exemplary video encoder to which the present principles may be applied is indicated generally by the reference numeral 600.

The video encoder 600 includes a frame ordering buffer 610 having an output in signal communication with a non-inverting input of a combiner 685. An output of the combiner 685 is connected in signal communication with a first input of a transformer and quantizer 625. An output of the transformer and quantizer 625 is connected in signal communication with a first input of an entropy coder 645 and a first input of an inverse transformer and inverse quantizer 650. An output of the entropy coder 645 is connected in signal communication with a first non-inverting input of a combiner 690. An output of the combiner 690 is connected in signal communication with a first input of an output buffer 635.

A first output of an encoder controller 605 is connected in signal communication with a second input of the frame ordering buffer 610, a second input of the inverse transformer and inverse quantizer 650, an input of a picture-type decision module 615, a first input of a macroblock-type (MB-type) decision module 620, a second input of an intra prediction module 660, a second input of a deblocking filter 665, a first input of a motion compensator 670, a first input of a motion estimator 675, and a second input of a reference picture buffer 680.

A second output of the encoder controller 605 is connected in signal communication with a first input of a Supplemental Enhancement Information (SEI) inserter 630, a second input of the transformer and quantizer 625, a second input of the entropy coder 645, a second input of the output buffer 635, and an input of the Sequence Parameter Set (SPS) and Picture Parameter Set (PPS) inserter 640.

An output of the SEI inserter 630 is connected in signal communication with a second non-inverting input of the combiner 690.

A first output of the picture-type decision module 615 is connected in signal communication with a third input of the frame ordering buffer 610. A second output of the picture-type decision module 615 is connected in signal communication with a second input of a macroblock-type decision module 620.

An output of the Sequence Parameter Set (SPS) and Picture Parameter Set (PPS) inserter 640 is connected in signal communication with a third non-inverting input of the combiner 690.

An output of the inverse quantizer and inverse transformer 650 is connected in signal communication with a first non-inverting input of a combiner 619. An output of the combiner 619 is connected in signal communication with a first input of the intra prediction module 660 and a first input of the deblocking filter 665. An output of the deblocking filter 665 is connected in signal communication with a first input of a reference picture buffer 680. An output of the reference picture buffer 680 is connected in signal communication with a second input of the motion estimator 675 and a third input of the motion compensator 670. A first output of the motion estimator 675 is connected in signal communication with a second input of the motion compensator 670. A second output of the motion estimator 675 is connected in signal communication with a third input of the entropy coder 645.

An output of the motion compensator 670 is connected in signal communication with a first input of a switch 697. An output of the intra prediction module 660 is connected in signal communication with a second input of the switch 697.

An output of the macroblock-type decision module 620 is connected in signal communication with a third input of the switch 697. The third input of the switch 697 determines whether or not the "data" input of the switch (as compared to the control input, i.e., the third input) is to be provided by the motion compensator 670 or the intra prediction module 660. The output of the switch 697 is connected in signal communication with a second non-inverting input of the combiner 619 and an inverting input of the combiner 685.

A first input of the frame ordering buffer 610 and an input of the encoder controller 605 are available as inputs of the encoder 600, for receiving an input picture. Moreover, a second input of the Supplemental Enhancement Information (SEI) inserter 630 is available as an input of the encoder 600, for receiving metadata. An output of the output buffer 635 is available as an output of the encoder 600, for outputting a bitstream.

Figure 7:
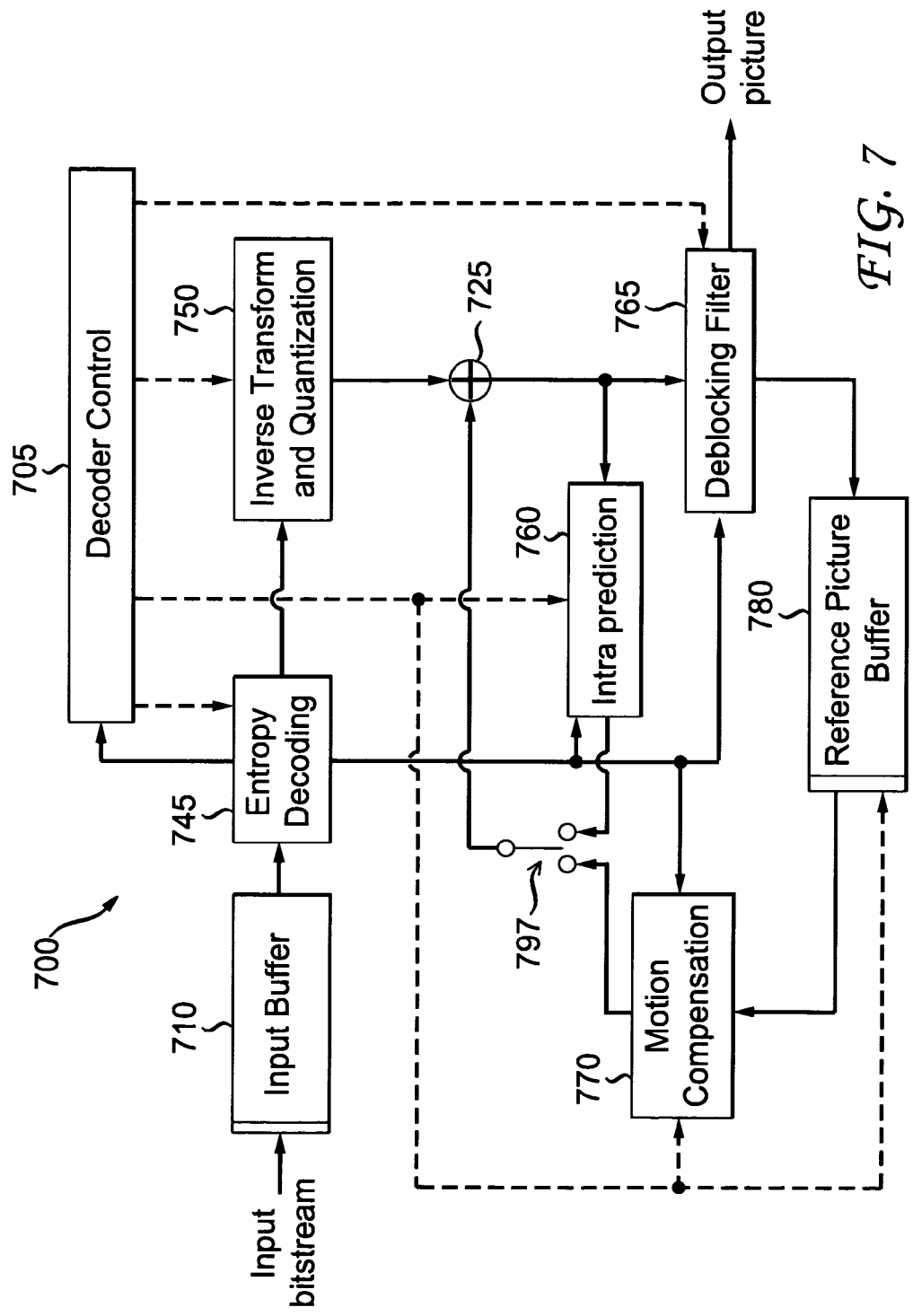
FIG. 7 is a block diagram showing an exemplary video decoder to which the present principles may be applied, in accordance with an embodiment of the present principles.

Turning to FIG. 7, an exemplary video decoder to which the present principles may be applied is indicated generally by the reference numeral 700.

The video decoder 700 includes an input buffer 710 having an output connected in signal communication with a first input of an entropy decoder 745. A first output of the entropy decoder 745 is connected in signal communication with a first input of an inverse transformer and inverse quantizer 750. An output of the inverse transformer and inverse quantizer 750 is connected in signal communication with a second non-inverting input of a combiner 725. An output of the combiner 725 is connected in signal communication with a second input of a deblocking filter 765 and a first input of an intra prediction module 760. A second output of the deblocking filter 765 is connected in signal communication with a first input of a reference picture buffer 780. An output of the reference picture buffer 780 is connected in signal communication with a second input of a motion compensator 770.

A second output of the entropy decoder 745 is connected in signal communication with a third input of the motion compensator 770, a first input of the deblocking filter 765, and a third input of the intra predictor 760. A third output of the entropy decoder 745 is connected in signal communication with an input of a decoder controller 705. A first output of the decoder controller 705 is connected in signal communication with a second input of the entropy decoder 745. A second output of the decoder controller 705 is connected in signal communication with a second input of the inverse transformer and inverse quantizer 750. A third output of the decoder controller 705 is connected in signal communication with a third input of the deblocking filter 765. A fourth output of the decoder controller 705 is connected in signal communication with a second input of the intra prediction module 760, a first input of the motion compensator 770, and a second input of the reference picture buffer 780.

An output of the motion compensator 770 is connected in signal communication with a first input of a switch 797. An output of the intra prediction module 760 is connected in signal communication with a second input of the switch 797. An output of the switch 797 is connected in signal communication with a first non-inverting input of the combiner 725.

An input of the input buffer 710 is available as an input of the decoder 700, for receiving an input bitstream. A first output of the deblocking filter 765 is available as an output of the decoder 700, for outputting an output picture.

As noted above, the present principles are directed to methods and apparatus for efficient video encoding and decoding of intra prediction mode. Recognizing the aforementioned limitations and deficiencies of the prior art, one or more embodiments of the present principles consider the spatial characteristics of a current block (to be encoded or decoded) to improve the efficiency of intra prediction mode coding.

Intra prediction can help improve video coding efficiency. However, the signaling of intra prediction modes may consume a lot of bits. Therefore, in accordance with at least one embodiment of the present principles, we disclose and describe efficient methods and apparatus for the coding and decoding of intra prediction mode syntax. In at least one embodiment, decoded intra prediction residues are used as side information to encode the intra prediction mode, such that the bits to convey intra prediction mode to the decoder can be avoided or minimized. For example, in at least one embodiment, the spatial pattern of the decoded intra prediction residues is used as side information.

The present principles make use of certain behaviors observed from video encoding and video decoding. When encoding video content, the encoder selects an intra prediction mode according to some criteria, and then performs intra prediction. On the one hand, the prediction error, also called the residue, is encoded (transformed, quantized, and entropy encoded) and transmitted to the decoder. On the other hand, the encoded intra prediction residue is also decoded at the encoder to reconstruct the current frame as the reference for coding subsequent frames. As previously mentioned, different intra prediction modes have different directions. We have observed that given an intra prediction mode, the spatial pattern of the decoded prediction residue has a high correlation with the direction of the intra mode. Thus, the present principles make use of this observation and can save bits for representing the intra prediction mode.

Embodiment 1

In a first embodiment (also interchangeably referred to herein as Embodiment 1), the encoder selects the best intra prediction mode m and encodes the prediction residues. Then the encoder examines the spatial pattern of the decoded residue to derive an intra prediction mode n as the most probable mode. The encoder transmits the residues and mode syntax to the decoder. The decoder first parses the residue syntax and derives the most probable mode n by examining the spatial pattern of the decoded residues. Then the mode syntax is parsed and the intra prediction mode is derived. In Embodiment 1, we can have a more accurate most probable mode than the method used in the MPEG-4 AVC Standard.

Figure 8:
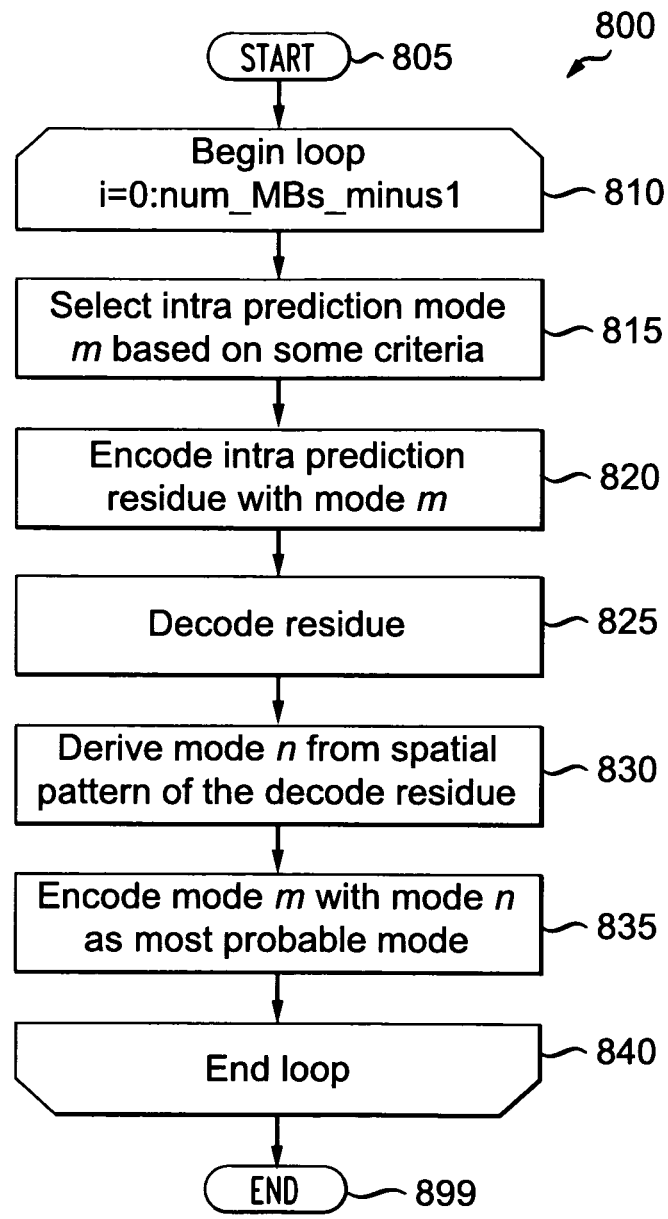
FIG. 8 is a flow diagram showing an exemplary method for encoding an intra prediction mode of a current block, in accordance with an embodiment of the present principles.

Turning to FIG. 8, an exemplary method for encoding an intra prediction mode of a current block in accordance with an embodiment of the present principles is indicated generally by the reference numeral 800. In particular, method 800 represents one exemplary encoding implementation of Embodiment 1, and involves deriving a most probable mode from a spatial pattern of decoded intra prediction residues to encode the intra prediction mode of the current block. The method 800 includes a start block 805 that passes control to a loop limit block 810. The loop limit block 810 begins a loop over each macroblock in a current picture using a variable i having a range from 0 to the number of blocks minus 1 (num_MBs_minus1), and passes control to a function block 815. The function block 815 selects an intra prediction mode m based on some criteria, and passes control to a function block 820. The function block 820 encodes the intra prediction residue with mode m, and passes control to a function block 825. The function block 825 decodes the residue, and passes control to a function block 830. The function block 830 derives mode n from the spatial pattern of the decoded residue, and passes control to a function block 835. The function block 835 encodes mode m with mode n as the most probable mode, and passes control to a loop limit block 840. The loop limit block 840 ends the loop over each macroblock, and passes control to an end block 899.

Figure 9:
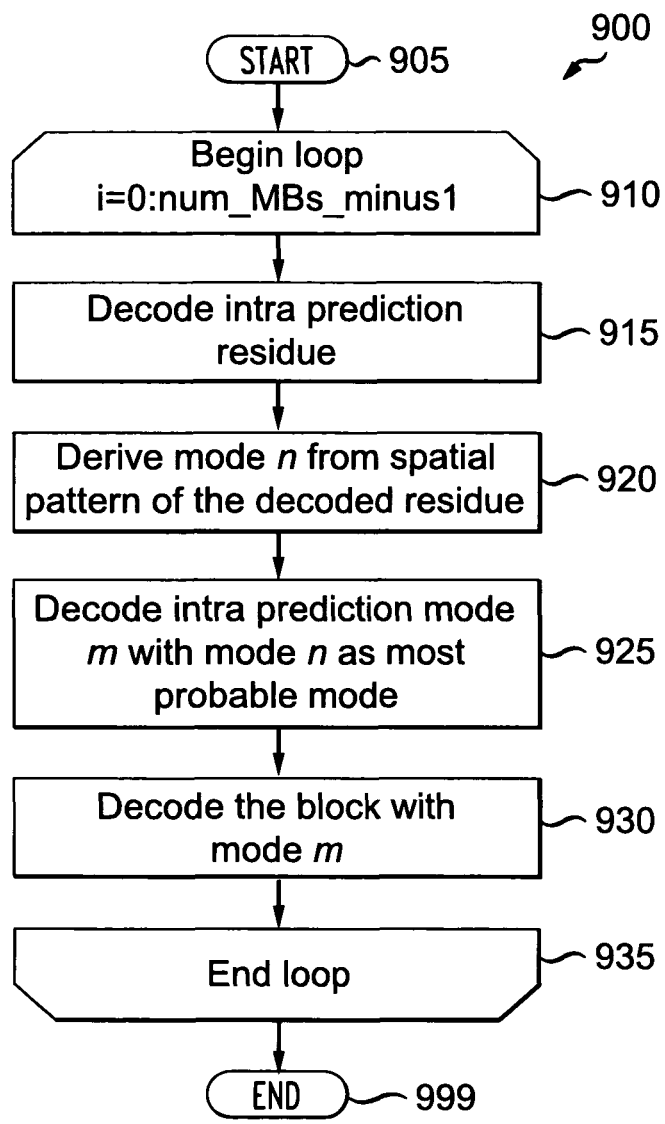
FIG. 9 is a flow diagram showing an exemplary method for decoding an intra prediction mode of a current block, in accordance with an embodiment of the present principles.

Turning to FIG. 9, an exemplary method for decoding an intra prediction mode of a current block in accordance with an embodiment of the present principles is indicated generally by the reference numeral 900. In particular, method 900 represents one exemplary decoding implementation of Embodiment 1, and involves deriving a most probable mode from a spatial pattern of decoded intra prediction residues to decode the intra prediction mode of the current block. The method 900 includes a start block 905 that passes control to a loop limit block 910. The loop limit block 910 begins a loop over each macroblock in a current picture using a variable i having a range from 0 to the number of macroblocks minus 1 (num_MBs_minus1), and passes control to a function block 915. The function block 915 decodes the intra prediction residue, and passes control to a function block 920. The function block 920 derives the mode n from the spatial pattern of the decoded residue, and passes control to a function block 925. The function block 925 decodes the intra prediction mode m with mode n as the most probable mode, and passes control to a function block 930. The function block 930 decodes the block with mode m, and passes control to a loop limit block 935. The loop limit block 935 ends the loop over each of the macroblocks, and passes control to an end block 999.

For Embodiment 1, several different methods can be used to derive the intra prediction mode n from the spatial pattern of decoded residues:

1. One way is to apply a Sobel operator to calculate the gradient and the edge orientation (which is defined to be a unity vector that is perpendicular to the gradient) at each decoded residue pixel. The edge orientation is averaged over the whole residue block and the derived intra prediction mode n is the one that has the minimum angle difference to the average edge orientation. If the average gradient amplitude in this block is smaller than a threshold, DC mode is selected as n. n is used as the most probable mode.

2. Another way is to predefine some template blocks with directional texture and have the directions of the textures correspond to different intra prediction modes. The correlation between the residue block and each of these template blocks is calculated. Intra prediction mode n is selected from the template block that has the highest correlation with the residue block.

3. In some other ways, the spatial pattern of the decoded residue can be analyzed from the transform domain. The decoded residue block is transformed first. The transform can be, but is not limited to, a discrete cosine transform (DCT), an integer implementation of DCT, a Hadamard transform, a wavelet transform, and so forth. In the transformed block, coefficients at different locations correspond to different spatial patterns (for example, the first transform coefficient corresponds to a flat residue block; the coefficients in the first row correspond to a block composed of vertical patterns with different period). We can define significant coefficients to be those whose amplitude is larger than a predefined threshold. The output intra prediction mode n is a function of the locations of these significant coefficients or a function of both the amplitudes and the locations of these significant coefficients.

EXAMPLE

The following is a particular example that elaborates Embodiment 1. While the following example is based on MEPG-4 AVC standard, as noted above, the present principles may be applied to other video coding standards, recommendations and extensions thereof.

Encoder Side:

Suppose the current block is an intra block. The encoder tests different intra prediction modes (different intra prediction directions) for encoding this block and selects a mode that has the minimum rate-distortion cost. Let m be the selected intra prediction mode. We use B to denote the current block, and P to denote its prediction given m is the intra prediction mode. Both P and B are 2-D N×N arrays where N×N is size of the block. The prediction residue R is also an N×N block where R=B−P.

The residue block is transformed and the transform coefficients are quantized. On the one hand, the quantized transform coefficients are sent to the decoder. On the other hand, the quantized transform coefficients are inverse quantized followed by inverse transformed at the encoder, giving rise to decoded (also called reconstructed) residue coefficients. We use K to represent the block of decoded residue coefficients.

For every location (i, j) in K, Sobel operator is applied to calculate the gradient at (i,j), where i, j=0 ... N−1. Let f (i,j) be the absolute amplitude of the gradient at (i,j), and g(i,j) be the direction of the gradient at (i,j). We further define h(i,j)= (g(i,j)+90)%180 to be the edge orientation at location (i,j), where % is the modulation operation to restrict the value of h(i,j) in the range of (0, 180).

We calculate the average gradient amplitude $f_{avg}$ and the average edge orientation $h_{avg}$ as follows:

$$f_{avg} = \frac{1}{N \times N} \sum_{i=0}^{N-1} \sum_{j=0}^{N-1} f(i, j)$$

$$h_{avg} = \frac{1}{N \times N} \sum_{i=0}^{N-1} \sum_{j=0}^{N-1} h(i, j)$$

If $f_{avg}$ is smaller than a user-defined threshold T (known to both the encoder and the decoder), then select DC mode as the most probable mode n to encode the intra prediction mode of the current block m.

If $f_{avg}$ is equal or larger than the threshold T, the most probable mode n is selected as follows:

$$n = \underset{k}{\operatorname{argmin}} \operatorname{abs}(\operatorname{angle}(k) - h_{avg})$$

where angle (k) is the prediction direction of intra prediction mode k The most probable mode n is used to encode the intra prediction mode m.

Decoder Side:

For decoding an intra prediction block, the decoder first parses the syntax of quantized transformed residue coefficients. With inverse quantization and inverse transformation, intra prediction residues are decoded (reconstructed). For the decoded residue block, we calculate the average gradient amplitude $f_{avg}$ and the average edge orientation $h_{avg}$ using the same methods as at the encoder side.

If $f_{avg}$ is smaller than the threshold T, we use DC mode as the most probable mode n to decode the intra prediction mode of the current block, which we denote as m.

If $f_{avg}$ is equal or larger than the threshold T, the most probable mode n is selected in the same way as the encoder, i.e., as follows:

$$n = \underset{k}{\operatorname{argmin}} \operatorname{abs}(\operatorname{angle}(k) - h_{avg})$$

where angle (k) is the prediction direction of intra prediction mode k The most probable mode n is used to decode the intra prediction mode m.

Embodiment 2

In a second embodiment (also interchangeably referred to herein as Embodiment 2), two most probable mode candidates are used in intra coding. The first most probable mode candidate n is derived by checking the spatial pattern of the decoded residue (for example, the method described in Embodiment 1). The second most probable mode candidate k is derived using a different method (for example, but not limited to, the method in the MPEG-4 AVC Standard). If the two most probable mode candidates are the same, n=k, then the same method is used as set forth in the MPEG-4 AVC Standard. If the two most probable mode candidates are different, then a Boolean syntax flag_mpm is transmitted to signal which one of the two most probable mode candidates is used. At the decoder, the most probable mode candidate n is derived from the decoded residues and the most probable mode candidate k is derived using another method. Then if n and k are different, flag_mpm is decoded to select the most probable mode for decoding intra mode.

Figure 10:
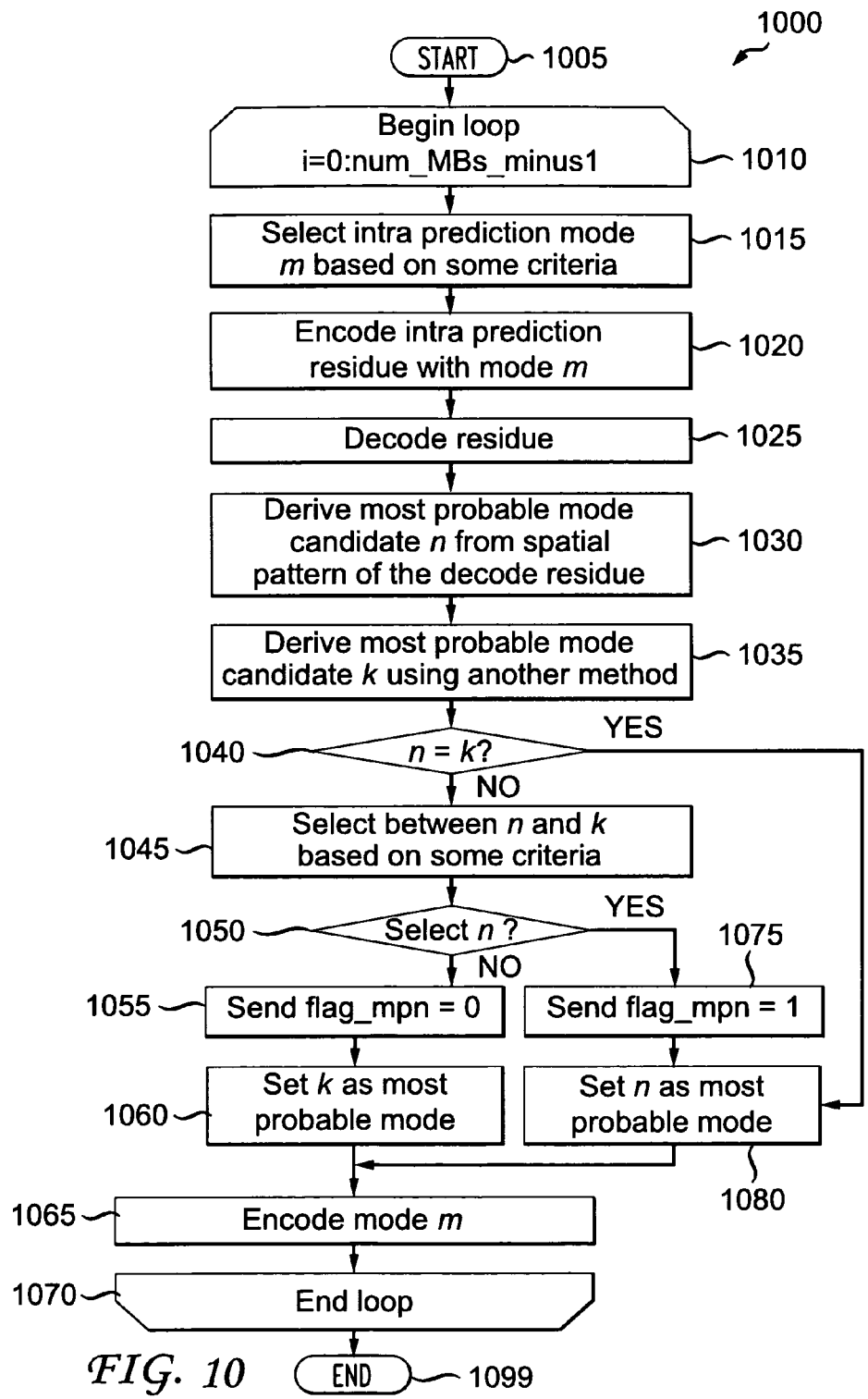
FIG. 10 is a flow diagram showing another exemplary method for encoding an intra prediction mode of a current block, in accordance with an embodiment of the present principles.

Turning to FIG. 10, another exemplary method for encoding an intra prediction mode of a current block in accordance with an embodiment of the present principles is indicated generally by the reference numeral 1000. In particular, method 1000 represents one exemplary encoding implementation of Embodiment 2, and involves deriving a mode from a spatial pattern of decoded prediction residues, wherein the mode is capable of being used as a most probable mode for encoding the intra prediction mode of the current block. The method 1000 includes a start block 1005 that passes control to a loop limit block 1010. The loop limit block 1010 begins a loop over each macroblock in a current picture using a variable i having a range from 0 to the number of macroblocks minus 1 (hum_MBs_minus1), and passes control to a function block 1015. The function block 1015 selects the intra prediction mode m based on some criteria, and passes control to a function block 1020. The function block 1020 encodes the intra prediction residue with mode m, and passes control to a function block 1025. The function block 1025 decodes the residue, and passes control to a function block 1030. The function block 1030 derives the most probable mode candidate n from the spatial pattern of the decoded residue, and passes control to a function block 1035. The function block 1035 derives the most probable mode candidate k using another method, and passes control to a decision block 1040. The decision block 1040 determines whether or not n=k. If so, then control is passed to a function block 1080. Otherwise, control is passed to a function block 1045.

The function block 1080 sets n as the most probable mode, and passes control to a function block 1065. The function block 1065 encodes mode m, and passes control to a function block 1070. The function block 1070 ends the loop over each macroblock, and passes control to an end block 1099.

The function block 1045 selects between n and k based on some criteria, and passes control to a decision block 1050. The decision block 1050 determines whether or not n has been selected (previously by function block 1045). If so, then control is passed to a function block 1075. Otherwise, control is passed to a function block 1055.

The function 1075 sends flag_mpm=1, and passes control to the function block 1080.

The function block 1055 sends flag_mpm=0, and passes control to a function block 1060. The function block 1060 sets k as the most probable mode, and passes control to the function block 1065.

Figure 11:
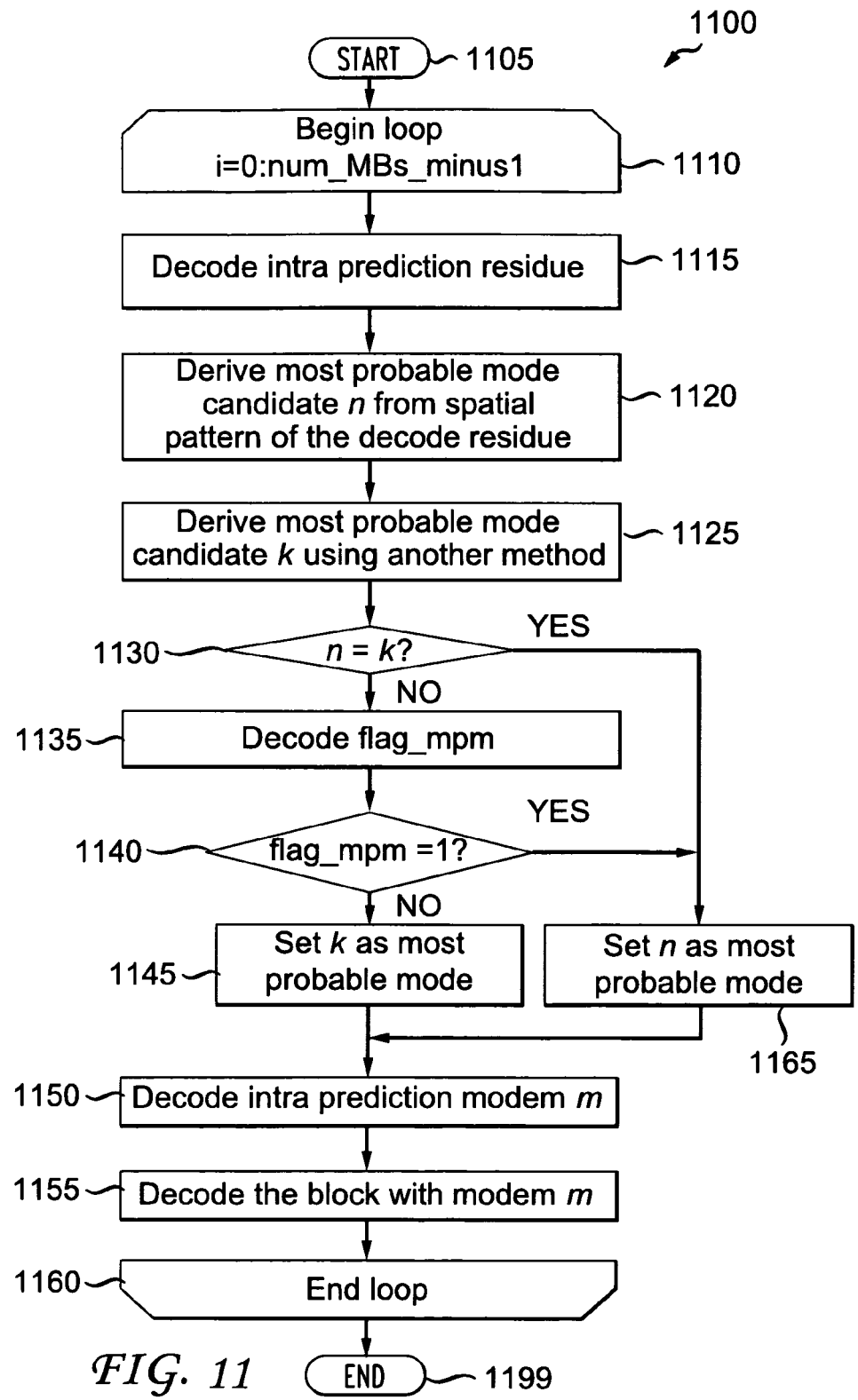
FIG. 11 is a flow diagram showing another exemplary method for decoding an intra prediction mode of a current block, in accordance with an embodiment of the present principles.

Turning to FIG. 11, another exemplary method for decoding an intra prediction mode of a current block in accordance with an embodiment of the present principles is indicated generally by the reference numeral 1100. In particular, method 1100 represents one exemplary decoding implementation of Embodiment 2, and involves deriving a mode from a spatial pattern of decoded prediction residues, wherein the mode is capable being used as a most probable mode for decoding an intra prediction mode of the current block. The method 1100 includes a start block 1105 that passes control to a loop limit block 1110. The loop limit block 1110 begins a loop over each macroblock in a current picture using a variable i having a range from 0 to the number of macroblocks minus 1 (num_MBs_minus1), and passes control to a function block 1115. The function block 1115 decodes the intra prediction residue, and passes control to a function block 1120. The function block 1120 derives the most probable candidate n from the spatial pattern of the decoded residue, and passes control to a function block 1125. The function block 1125 derives the most probable candidate k using another method, and passes control to a decision block 1130. The decision block 1130 determines whether or not n=k. If so, then control is passed to a function block 1165. Otherwise, control is passed to a function block 1135.

The function block 1165 sets n as the most probable mode, and passes control to a function block 1150. The function block 1150 decodes intra prediction mode m, and passes control to a function block 1155. The function block 1155 decodes the block with mode m, and passes control to a loop limit block 1160. The loop limit block 1160 ends the loop over each of the macroblocks, and passes control to an end block 1199.

The function block 1135 decodes flag_mpm, and passes control to a decision block 1140. The decision block 1140 determines whether or not flag_mpm=1. If so, then control is passed to the function block 1165. Otherwise, control is passed to a function block 1145. The function block 1145 sets k as the most probable mode, and passes control to the function block 1150.

For Embodiment 2, the encoder needs to select one out of two modes, n and k, as the most probable mode in coding. The selection criterion can be, but is not limited to, the following methods:

1. The selection of most probable mode is based on the number of bits require to encode the intra prediction mode.
2. The selection of most probable mode is based on the index difference between the most probable mode and the intra prediction mode.

Embodiment 3

In a third embodiment (also interchangeably referred to herein as Embodiment 3), the encoder selects the best intra prediction mode m and encodes the prediction residues. Then the encoder examines the spatial pattern of the decoded residue to derive a set of intra prediction modes. The derived set is a subset of the default mode set S (i.e., 9 modes for Intra 4×4, 8×8 and 4 modes for Intra 16×16). The encoder selects between the default mode set and the derived mode subset for encoding and notifies the decoder using a Boolean syntax flag_subset. If the mode subset is selected, then flag_subset=1 is transmitted followed by a mode index associated with this mode subset S. If the default mode set is selected, then flag_subset=0 is transmitted followed by a mode index associated with the default mode set. The decoder parses the residue syntax, flag_subset and mode index syntax. If flag_subset=1, then the decoder derives the mode subset from the decoded residue. If flag_subset=0, then the decoder uses the default mode table. One advantage of Embodiment 3 is we can have fewer modes in the candidate set, thus reducing the number of signaling bits for intra mode. For example, if the subset includes only 5 modes instead of 9 modes, we need only 2 bits instead of 3 bits to signal rem_intra4×4_pred_mode.

Figure 12:
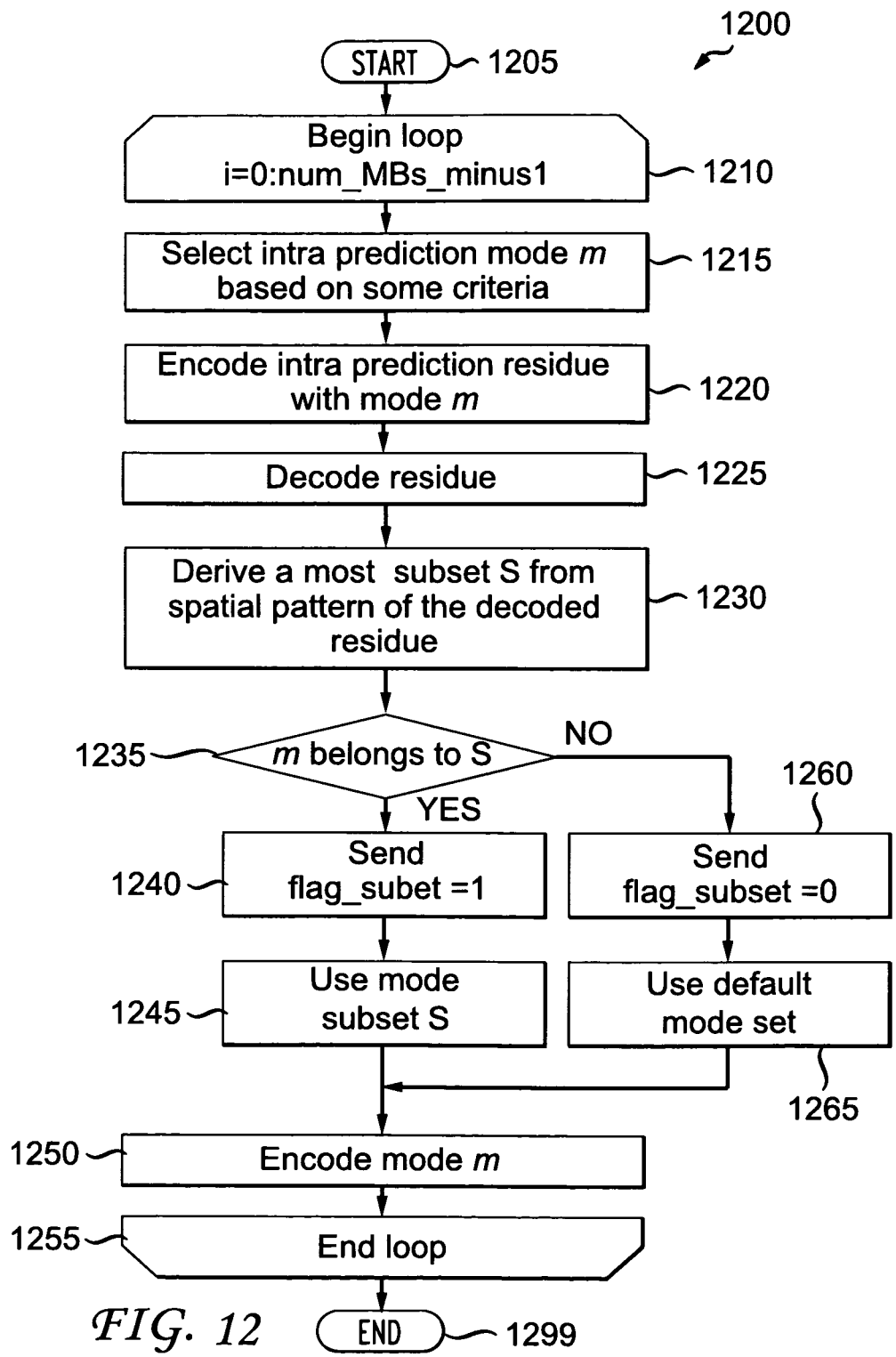
FIG. 12 is a flow diagram showing yet another exemplary method for encoding an intra prediction mode of a current block, in accordance with an embodiment of the present principles.

Turning to FIG. 12, yet another exemplary method for encoding an intra prediction mode of a current block in accordance with an embodiment of the present principles is indicated generally by the reference numeral 1200. In particular, method 1200 represents one exemplary encoding implementation of Embodiment 3, and involves deriving a mode subset from a spatial pattern of decoded prediction residues, wherein the mode subset is capable of being used to encode the intra prediction mode of the current block. The method 1200 includes a start block 1205 that passes control to a loop limit block 1210. The loop limit block 1210 begins a loop over each macroblock in a current picture using a variable i having a range from 0 to the number of macroblocks minus 1 (num_MBs_minus1), and passes control to a function block 1215. The function block 1215 selects intra prediction mode m based on some criteria, and passes control to a function block 1220. The function block 1220 encodes the intra prediction residue with mode m, and passes control to a function block 1225. The function block 1225 decodes the residue, and passes control to a function block 1230. The function block 1230 derives a mode subset S from the spatial pattern of the decoded residue, and passes control to a decision block 1235. The decision block 1235 determines whether or not mode m belongs to subset S. If so, then control is passed to a function block 1240. Otherwise, control is passed to a function block 1260. The function block 1240 sends flag_subset=1, and passes control to a function block 1245. The function block 1245 uses mode subset S, and passes control to a function block 1250. The function block 1250 encodes mode m, and passes control to a loop limit block 1255. The loop limit block 1255 ends the loop over each macroblock, and passes control to an end block 1299.

The function block 1260 sends flag_subset=0, and passes control to a function block 1265. The function block 1265 uses the default mode set, and passes control to the function block 1250.

Figure 13:
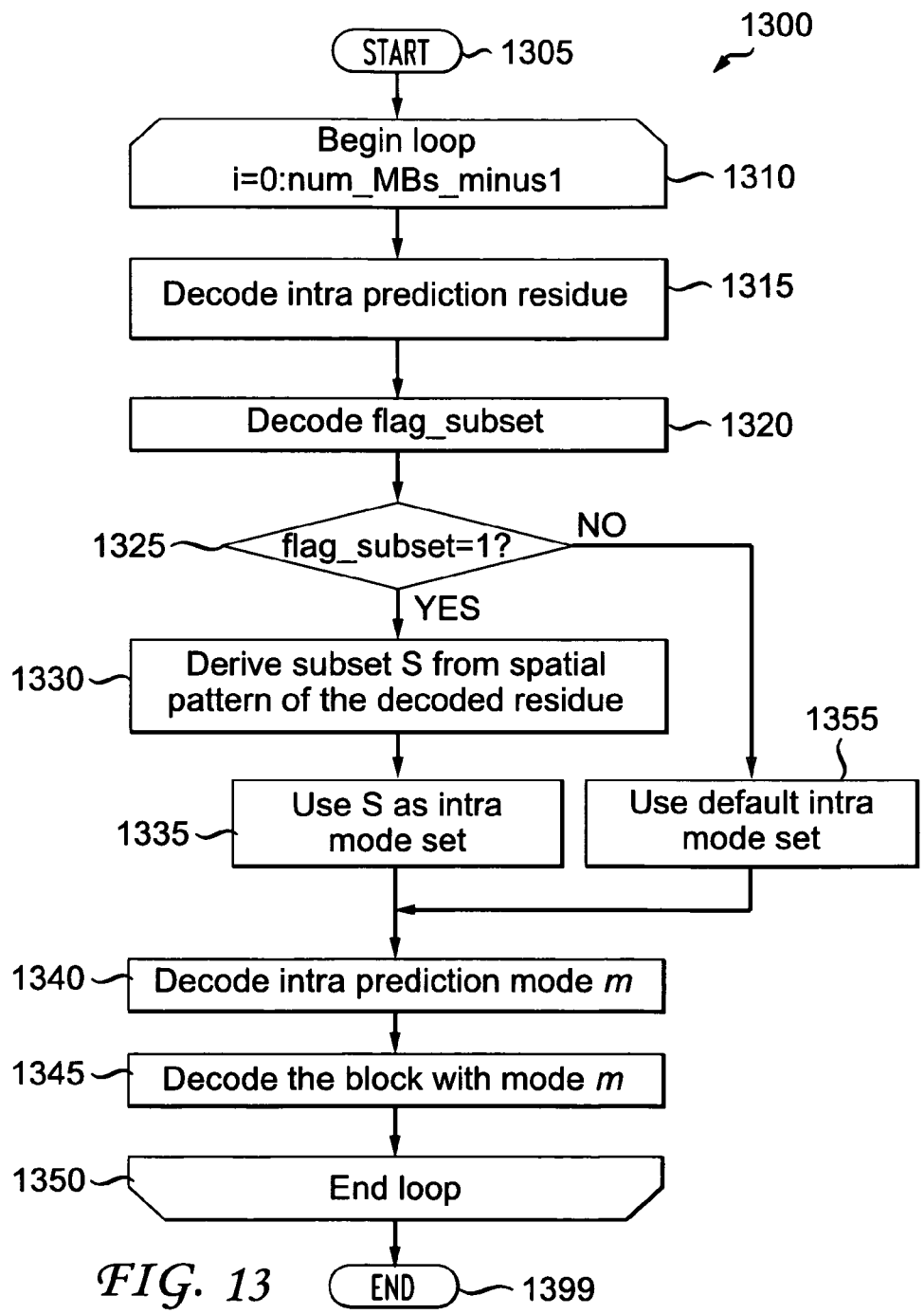
FIG. 13 is a flow diagram showing yet another exemplary method for decoding an intra prediction mode of a current block, in accordance with an embodiment of the present principles.

Turning to FIG. 13, yet another exemplary method for decoding an intra prediction mode of a current block in accordance with an embodiment of the present principles is indicated generally by the reference numeral 1300. In particular, method 1300 represents one exemplary decoding implementation of Embodiment 3, and involves deriving a mode subset from a spatial pattern of decoded prediction residues, the mode subset capable of being used to decode the intra prediction mode of the current block. The method 1300 includes a start block 1305 that passes control to a loop limit block 1310. The loop limit block 1310 begins a loop over each macroblock in a current picture using a variable i having a range from 0 to the number of macroblocks minus 1 (num_MBs_minus1), and passes control to a function block 1315. The function block 1315 decodes the intra prediction residue, and passes control to a function block 1320. The function block 1320 decodes flag_subset, and passes control to a decision block 1325. The decision block 1325 determines whether or not flag_subset=1. If so, then control is passed to a function block 1330. Otherwise, control is passed to a function block 1355.

The function block 1330 derives subset S from the spatial pattern of the decoded residue, and passes control to a function block 1335. The function block 1335 uses subset S as the intra mode set, and passes control to a function block 1340.

The function block 1340 decodes the intra prediction mode m, and passes control to a function block 1345. The function block 1345 decodes the block with mode m, and passes control to a loop limit block 1350. The loop limit block 1350 ends the loop over each of the macroblocks, and passes control to an end block 1399.

The function block 1355 uses the default intra mode set, and passes control to the function block 1340.

For Embodiment 3, the criterion for selection between the derived mode subset S and the default mode set can be, but is not limited to, the following:
1. If the used intra mode m is included in the derived mode subset S, then the mode subset S is used. Otherwise, the default set is used.
2. If the used intra mode m is included in the derived subset S and the index of the intra mode in the subset S is smaller than that in the default set, then the subset S is selected. Otherwise, the default set is selected.
3. If the used intra mode m is included in the derived subset S and the coding bits for mode m using this subset are fewer than the coding bits for mode m using the default set, then the subset is selected. Otherwise, the default set is selected.

Embodiment 4

In a fourth embodiment (also interchangeably referred to herein as Embodiment 4), the encoder selects the best intra prediction mode m and encodes the prediction residues. Then the encoder examines the spatial pattern of the decoded residue to derive an intra prediction mode n. If n is different from m, then the encoder processes the decoded residue such that mode m is embedded into the residue to make sure the derived mode n=m. In this embodiment, we do not need to signal intra mode information at all. The decoder does not need any syntax about intra mode. The decoder only needs the residue which is extracted from the bit-stream and infers the intra prediction mode m for decoding.

For Embodiment 4, the methods to embed the intra mode into the residue can be, but are not limited to, the following:
1. Let X be the intra prediction residue of the current block. The embedding of mode information is implemented by modifying X before transform and quantization and thus is a spatial-domain method. The modification of X is achieved by adding a variation matrix T to X. Let Y be the modified residue block, Y=X+T. The variation matrix T is selected such that it has the minimum norm (the norm can be l1, l2 or others) while mode m can be derived from the decoded version of Y.
2. Let X be the intra prediction residue of the current block, and x be the DCT transform of X. Both X and x are matrices with the same size of the current block. The embedding of mode information is implemented by modifying DCT matrix x and thus is a transform-domain method. The modification of x is achieved by adding a variation matrix t to x. Let y be the modified residue DCT block, y=x+t. The variation matrix t is selected such that it has the minimum norm (the norm can be l1, l2 or others) while mode m can be derived from the decoded version of y.
3. Let X be the intra prediction residue of the current block, and x be the DCT transform of X. In the video encoding process, the DCT coefficients in x are quantized and represented by quantization indices. Let x' be a matrix that includes the quantized indices of the DCT coefficients in x. The embedding of mode information is implemented by modifying the quantization index matrix x' and thus is a transform-domain method. The modification of x' is achieved by adding a variation matrix t' to x'. Let y' be the modified version of x', y'=x'+t'. The variation matrix t' is selected such that it has the minimum norm (the norm can be l1, l2 or others) while mode m can be derived from y'.

Figure 14:
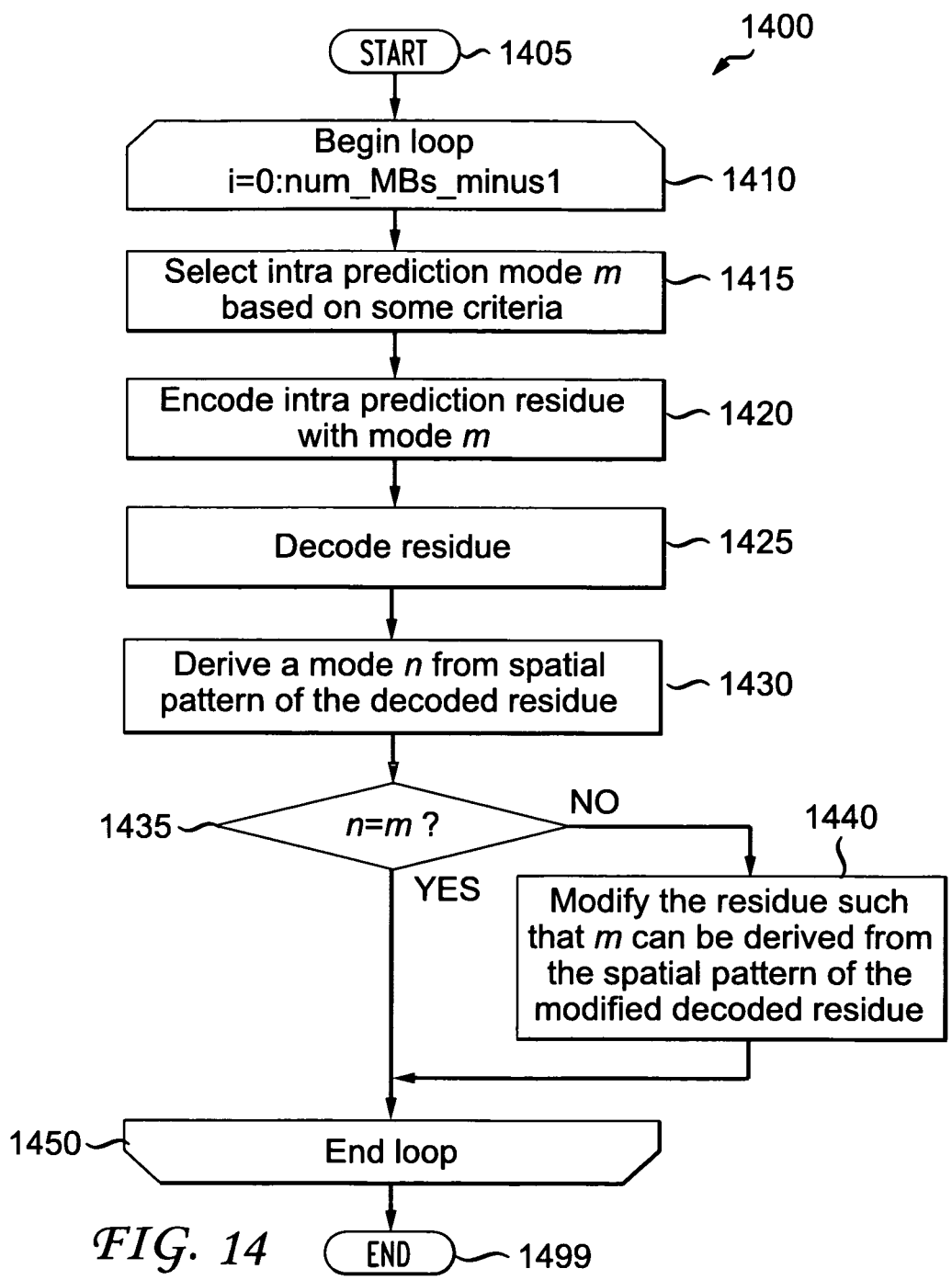
FIG. 14 is a flow diagram showing still another exemplary method for encoding an intra prediction mode of a current block, in accordance with an embodiment of the present principles.

Turning to FIG. 14, still another exemplary method for encoding an intra prediction mode of a current block in accordance with an embodiment of the present principles is indicated generally by the reference numeral 1400. In particular, method 1400 represents one exemplary encoding implementation of Embodiment 4, and involves embedding the intra prediction mode of the current block into the spatial pattern of decoded prediction residues. The method 1400 includes a start block 1405 that passes control to a loop limit block 1410. The loop limit block 1410 begins a loop over each macroblock in a current picture using a variable i having a range from 0 to the number of macroblocks minus 1 (num_MBs_minus1), and passes control to a function block 1415. The function block 1415 selects intra prediction mode m based on some criteria, and passes control to a function block 1420. The function block 1420 encodes the intra prediction residue with mode m, and passes control to a function block 1425. The function block 1425 decodes the residue, and passes control to a function block 1430. The function block 1430 derives a mode n from the spatial pattern of the decoded residue, and passes control to a decision block 1435. The decision block 1435 determines whether or not n=m. If so, then control is passed to a loop limit block 1450. Otherwise, control is passed to a function block 1440. The function block 1440 modifies the residue such that m can be derived from the spatial pattern of the modified decoded residue, and passes control to the loop limit block 1450. The loop limit block 1450 ends the loop over each macroblock, and passes control to an end block 1499.

Figure 15:
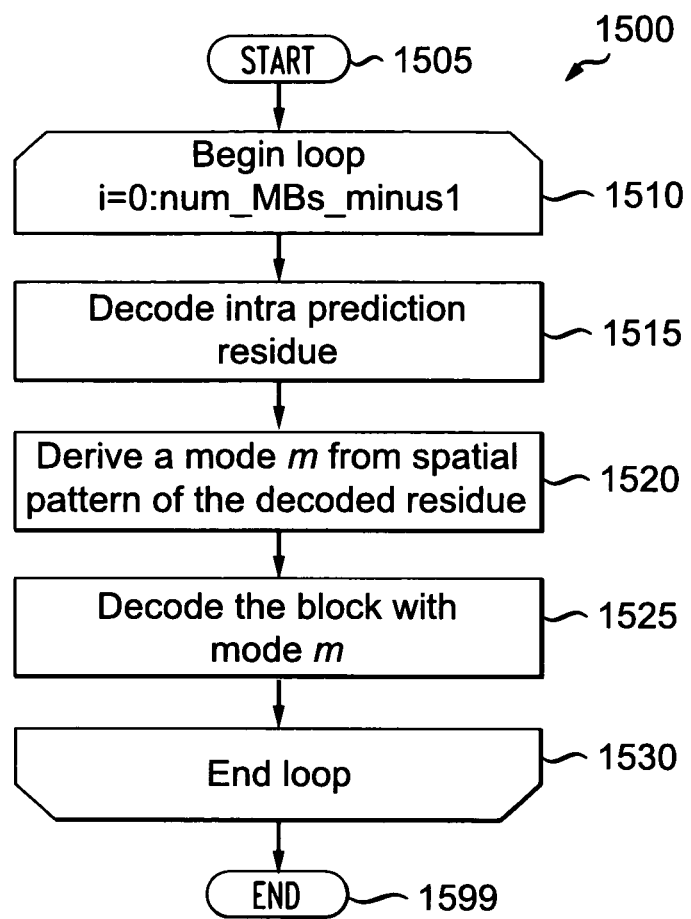
FIG. 15 is a flow diagram showing still another exemplary method for decoding an intra prediction mode of a current block, in accordance with an embodiment of the present principles.

Turning to FIG. 15, still another exemplary method for decoding an intra prediction mode of a current block in accordance with an embodiment of the present principles is indicated generally by the reference numeral 1500. In particular, method 1500 represents one exemplary decoding implementation of Embodiment 4, and involves deriving the intra prediction mode of the current block from the spatial pattern of decoded prediction residues. The method 1500 includes a start block 1505 that passes control to a loop limit block 1510. The loop limit block 1510 begins a loop over each macroblock in a current picture using a variable i having a range from 0 to the number of macroblocks minus 1 (num_MBs_minus1), and passes control to a function block 1515. The function block 1515 decodes the intra prediction residue, and passes control to a function block 1520. The function block 1520 derives a mode m from the spatial pattern of the decoded residue, and passes control to a function block 1525. The function block 1525 decodes the block with mode m, and passes control to a loop limit block 1530. The loop limit block 1530 ends the loop over each of the macroblocks, and passes control to an end block 1599.

EXAMPLE

The following is a particular example that elaborates Embodiment 4. While the following example is based on MEPG-4 AVC standard, as noted above, the present principles may be applied to other video coding standards, recommendations and extensions thereof.

Encoder Side:

Suppose the current block is an intra block. The encoder tests different intra prediction modes (different intra prediction directions) for encoding this block and selects a mode that has the minimum rate-distortion cost. Let m be the selected intra prediction mode. We use B to denote the current block, and P to denote its prediction given m is the intra prediction mode. Both P and B are 2-D N×N arrays where N×N is size of the block. The prediction residue R is also an N×N block where R=B−P.

The residue block is transformed and the transform coefficients are quantized. Let x' be a matrix that includes the quantized indices of the DCT coefficients. Afterwards, the quantized transform coefficients are inverse quantized followed by inverse transformed at the encoder, giving rise to decoded (also called reconstructed) residue coefficients. We use K to represent the block of decoded residue coefficients.

An intra prediction mode n is derived from the spatial pattern of K using the method of deriving the most probable mode as in the example of Embodiment 1.

If n equals to m, the quantization indices of residues (elements of x') are written into a bit stream.

If n is different from m, we generate a new quantization indices matrix y' by adding a variation matrix t' to x', y'=x'+t', and write y' into the bit stream. The matrix y' needs to satisfy the following two conditions:
1. Let K' be the decoded (inverse quantized followed by inverse transform) version of y'. The intra prediction mode derived from the spatial pattern of K' using the method of deriving the most probable mode as in the example of Embodiment 1 is mode m.
2. The l2 norm of y' is the smallest among all the matrices satisfying condition 1.

Decoder Side:

For decoding an intra prediction block, the decoder first parses the syntax of quantized transformed residue coefficients. With inverse quantization and inverse transformation, intra prediction residues are decoded (reconstructed). An intra prediction mode m is derived from the spatial pattern of decoded intra prediction residues using the method of deriving the most probable mode as in the example of embodiment 1. The derived mode m is the intra prediction mode of the current block.

Syntax

We have presented different embodiments, and for the different embodiments the corresponding syntax will be different. TABLE 1 shows exemplary syntax relating to Embodiment 2 described above.

TABLE 1

| macroblock_layer( ) { | Descriptor |
|---|---|
| .... | |
| flag_mpm | u(1) |
| .... | |
| } | |

The semantics of the syntax element shown in TABLE 1 is as follows:

flag_mpm equal to 1 specifies that the mode derived using the method described in Embodiment 1 is used as the most probable mode for decoding the intra prediction mode.

flag_mpm equal to 0 specifies that the mode derived using an alternative method (for example, the method in the MPEG-4 AVC Standard) is used as the most probable mode for decoding the intra prediction mode.

TABLE 2 shows exemplary syntax relating to Embodiment 3 described above.

TABLE 2

| macroblock_layer( ) { | Descriptor |
|---|---|
| .... | |
| flag_subset | u(1) |
| .... | |
| } | |

The semantics of the syntax element shown in TABLE 2 is as follows:

flag_subset equal to 0 specifies that the default mode set is used to derive the intra prediction mode.

flag_subset equal to 1 specifies that a subset of the default mode set is used to derive the intra prediction mode.

A description will now be given of some of the many attendant advantages/features of the present invention, some of which have been mentioned above. For example, one advantage/feature is an apparatus having a video encoder for encoding picture data for at least a block in a picture by determining a spatial pattern for a decoded intra prediction mode residue used to reconstruct the picture at the video encoder. The decoded intra prediction mode residue is obtained by inverse quantizing and inverse transforming a transformed and quantized difference between an original version of the block and at least one reference block. The spatial pattern is used to determine an intra prediction mode for encoding the block.

Another advantage/feature is the apparatus having the video encoder as described above, wherein the spatial pattern is used to determine a most probable mode, the most probable mode is used to encode the intra prediction mode for encoding the block, and the most probable mode is determined from among a plurality of intra prediction modes.

Yet another advantage/feature is the apparatus having the video encoder wherein the spatial pattern is used to determine a most probable mode, the most probable mode is used to encode the intra prediction mode for encoding the block, and the most probable mode is determined from among a plurality of intra prediction modes as described above, wherein the spatial pattern is used to determine the most probable mode by performing a spatial domain analysis of the spatial pattern.

Still another advantage/feature is the apparatus having the video encoder wherein the spatial pattern is used to determine the most probable mode by performing a spatial domain analysis of the spatial pattern as described above, wherein the spatial domain analysis is based on at least one of gradients of residue pixels in the decoded intra prediction mode residue, pre-processing followed by gradient calculation, and a correlation calculated between the decoded intra prediction mode residue and a predefined directional block mask.

A further advantage/feature is the apparatus having the video encoder wherein the spatial pattern is used to determine a most probable mode, the most probable mode is used to encode the intra prediction mode for encoding the block, and the most probable mode is determined from among a plurality of intra prediction modes as described above, wherein the spatial pattern is used to determine the most probable mode by performing a transform domain analysis of the spatial pattern.

Moreover, another advantage/feature is the apparatus having the video encoder wherein the spatial pattern is used to determine the most probable mode by performing a transform domain analysis of the spatial pattern as described above, wherein a transform utilized in the transform domain analysis includes at least one of a discrete cosine transform, an integer implementation of the discrete cosine transform, a Hadamard transform, and a wavelet transform, Further, another advantage/feature is the apparatus having the video encoder wherein the spatial pattern is used to determine the most probable mode by performing a transform domain analysis of the spatial pattern as described above, wherein the transform domain analysis is based on at least one of amplitudes and locations of significant transformed residue coefficients for the decoded intra prediction mode residue.

Also, another advantage/feature is the apparatus having the video encoder wherein the spatial pattern is used to determine a most probable mode, the most probable mode is used to encode the intra prediction mode for encoding the block, and the most probable mode is determined from among a plurality of intra prediction modes as described above, wherein more than one method is used to select the most probable mode.

Additionally, another advantage/feature is the apparatus having the video encoder wherein more than one method is used to select the most probable mode as described above, wherein the plurality of intra prediction modes represent a plurality of candidate intra prediction modes capable of being the most probable mode, and criteria used to select the most probable mode is selected from at least one of respective numbers of bits required to code the intra prediction mode for encoding the block with each of the plurality of intra prediction modes, and respective index differences between the intra prediction mode for encoding the block and each respective one of the plurality of intra prediction modes.

Moreover, another advantage/feature is the apparatus having the video encoder as described above, wherein an intra mode subset is derived by analyzing the spatial pattern, the intra mode subset comprising less than all available intra prediction modes, and wherein a mode set is determined from among at least a default intra prediction mode set and the intra mode subset, the default prediction mode set including all of the available intra prediction modes, the mode set used to encode the intra prediction mode for encoding the block.

Further, another advantage/feature is the apparatus having the video encoder wherein an intra mode subset is derived by analyzing the spatial pattern, the intra mode subset comprising less than all available intra prediction modes, and wherein a mode set is determined from among at least a default intra prediction mode set and the intra mode subset, the default prediction mode set including all of the available intra prediction modes, the mode set used to encode the intra prediction mode for encoding the block as described above, wherein the mode set used to encode the intra prediction mode of the block is determined from among at least the default intra prediction mode set and the intra mode subset based on at least one of an existence of an initial intra coding mode in the intra mode subset, an index of the initial intra coding mode in the intra mode subset, and a number of bits used to encode the initial intra coding mode using the intra mode subset, the initial intra coding mode used to code a residue for the block that is decoded to obtain the decoded intra prediction mode residue.

Also, another advantage/feature is the apparatus having the video encoder as described above, wherein the initial intra prediction mode is embedded in the spatial pattern.

Additionally, another advantage/feature is the apparatus having the video encoder wherein the initial intra prediction mode is embedded in the spatial pattern as described above, wherein an embedding operation to embed the initial intra prediction mode in the spatial pattern is performed in a transform domain.

Moreover, another advantage/feature is the apparatus having the video encoder wherein an embedding operation to embed the initial intra prediction mode in the spatial pattern is performed in a transform domain as described above, wherein the transformed and quantized difference is obtained by transforming and quantizing a difference between the original version of the block and the at least one reference block, and the initial intra prediction mode is embedded in the spatial pattern by modifying a quantized index of a transformed and quantized version of the difference between the original version of the block and the at least one reference block.

Further, another advantage/feature is the apparatus having the video encoder wherein the initial intra prediction mode is embedded in the spatial pattern as described above, wherein the transformed and quantized difference is obtained by transforming and quantizing a difference between the original version of the block and the at least one reference block, and the initial intra prediction mode is embedded in the spatial pattern by modifying an amplitude of a transformed and un-quantized version of the difference between the original version of the block and the at least one reference block.

Also, another advantage/feature is the apparatus having the video encoder wherein the initial intra prediction mode is embedded in the spatial pattern as described above, wherein an embedding operation to embed the initial intra prediction mode in the spatial pattern is performed in a spatial domain.

Additionally, another advantage/feature is the apparatus having the video encoder wherein an embedding operation to embed the initial intra prediction mode in the spatial pattern is performed in a spatial domain as described above, wherein the transformed and quantized difference is obtained by transforming and quantizing a difference between the original version of the block and the at least one reference block, and the initial intra prediction mode is embedded in the spatial pattern by modifying an amplitude of the difference between the original version of the block and the at least one reference block prior to the transforming and the quantizing.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder configured to encode at least a block by determining a spatial pattern for a decoded intra prediction mode residue used to reconstruct the block at the video encoder,
wherein the video encoder is further configured to determine the decoded intra prediction mode residue by inverse quantizing and inverse transforming a transformed and quantized difference between an original version of the block and at least prediction version of the block,
wherein the spatial pattern is used to determine a most probable mode used to encode an intra prediction mode for encoding the block.

2. The apparatus of claim 1, wherein the most probable mode is determined from among a plurality of intra prediction modes.

3. The apparatus of claim 2, wherein the spatial pattern is used to determine the most probable mode by performing a spatial domain analysis of the spatial pattern.

4. The apparatus of claim 3, wherein the spatial domain analysis is based on at least one of gradients of residue pixels in the decoded intra prediction mode residue, pre-processing followed by gradient calculation, and a correlation calculated between the decoded intra prediction mode residue and a predefined directional block mask.

5. The apparatus of claim 2, wherein the spatial pattern is used to determine the most probable mode by performing a transform domain analysis of the spatial pattern.

6. The apparatus of claim 5, wherein a transform utilized in the transform domain analysis comprises at least one of a discrete cosine transform, an integer implementation of the discrete cosine transform, a Hadamard transform, and a wavelet transform.

7. The apparatus of claim 5, wherein the transform domain analysis is based on at least one of amplitudes and locations of significant transformed residue coefficients for the decoded intra prediction mode residue.

8. The apparatus of claim 2, wherein more than one method is used to select the most probable mode.

9. The apparatus of claim 8, wherein the plurality of intra prediction modes represent a plurality of candidate intra prediction modes capable of being the most probable mode, and criteria used to select the most probable mode is selected from at least one of respective numbers of bits required to code the intra prediction mode for encoding the block with each of the plurality of intra prediction modes, and respective index differences between the intra prediction mode for encoding the block and each respective one of the plurality of intra prediction modes.

10. The apparatus of claim 1, wherein an intra mode subset is derived by analyzing the spatial pattern, the intra mode subset comprising less than all available intra prediction modes, and wherein a mode set is determined from among at least a default intra prediction mode set and the intra mode subset, the default prediction mode set including all of the available intra prediction modes, the mode set used to encode the intra prediction mode for encoding the block.

11. The apparatus of claim 10, wherein the mode set used to encode the intra prediction mode of the block is determined from among at least the default intra prediction mode set and the intra mode subset based on at least one of an existence of an initial intra coding mode in the intra mode subset, an index of the initial intra coding mode in the intra mode subset, and a number of bits used to encode the initial intra coding mode using the intra mode subset, the initial intra coding mode used to code a residue for the block that is decoded to obtain the decoded intra prediction mode residue.

12. The apparatus of claim 1, wherein the initial intra prediction mode is embedded in the spatial pattern.

13. The apparatus of claim 12, wherein an embedding operation to embed the initial intra prediction mode in the spatial pattern is performed in a transform domain.

14. The apparatus of claim 13, wherein the transformed and quantized difference is obtained by transforming and quantizing a difference between the original version of the block and the at least one reference block, and the initial intra prediction mode is embedded in the spatial pattern by modifying a quantized index of a transformed and quantized version of the difference between the original version of the block and the at least one reference block.

15. The apparatus of claim 12, wherein the transformed and quantized difference is obtained by transforming and quantizing a difference between the original version of the block and the at least one reference block, and the initial intra prediction mode is embedded in the spatial pattern by modifying an amplitude of a transformed and un-quantized version of the difference between the original version of the block and the at least one reference block.

16. The apparatus of claim 12, wherein an embedding operation to embed the initial intra prediction mode in the spatial pattern is performed in a spatial domain.

17. The apparatus of claim 16, wherein the transformed and quantized difference is obtained by transforming and quantizing a difference between the original version of the block and the at least one reference block, and the initial intra prediction mode is embedded in the spatial pattern by modifying an amplitude of the difference between the original version of the block and the at least one reference block prior to the transforming and the quantizing.

18. In a video encoder, a method, comprising:
encoding picture data for at least a block in a picture by determining a spatial pattern for a decoded intra prediction mode residue used to reconstruct the picture at the video encoder, the decoded intra prediction mode residue obtained by inverse quantizing and inverse transforming a transformed and quantized difference between an original version of the block and at least one reference block,
wherein the spatial pattern is used to determine a most probable mode used to encode an intra prediction mode for encoding the block.

19. The method of claim 18, wherein the most probable mode is determined from among a plurality of intra prediction modes.

20. The method of claim 19, wherein the spatial pattern is used to determine the most probable mode by performing a spatial domain analysis of the spatial pattern.

21. The method of claim 20, wherein the spatial domain analysis is based on at least one of gradients of residue pixels in the decoded intra prediction mode residue, pre-processing followed by gradient calculation, and a correlation calculated between the decoded intra prediction mode residue and a predefined directional block mask.

22. The method of claim 19, wherein the spatial pattern is used to determine the most probable mode by performing a transform domain analysis of the spatial pattern.

23. The method of claim 22, wherein a transform utilized in the transform domain analysis comprises at least one of a discrete cosine transform, an integer implementation of the discrete cosine transform, a Hadamard transform, and a wavelet transform.

24. The method of claim 22, wherein the transform domain analysis is based on at least one of amplitudes and locations of significant transformed residue coefficients for the decoded intra prediction mode residue.

25. The method of claim 19, wherein more than one method is used to select the most probable mode.

26. The method of claim 25, wherein the plurality of intra prediction modes represent a plurality of candidate intra prediction modes capable of being the most probable mode, and criteria used to select the most probable mode is selected from at least one of respective numbers of bits required to code the intra prediction mode for encoding the block with each of the plurality of intra prediction modes, and respective index differences between the intra prediction mode for encoding the block and each respective one of the plurality of intra prediction modes.

27. The method of claim 18, wherein an intra mode subset is derived by analyzing the spatial pattern, the intra mode subset comprising less than all available intra prediction modes, and wherein a mode set is determined from among at least a default intra prediction mode set and the intra mode subset, the default prediction mode set including all of the available intra prediction modes, the mode set used to encode the intra prediction mode for encoding the block.

28. The method of claim 27, wherein the mode set used to encode the intra prediction mode of the block is determined from among at least the default intra prediction mode set and the intra mode subset based on at least one of an existence of an initial intra coding mode in the intra mode subset, an index of the initial intra coding mode in the intra mode subset, and a number of bits used to encode the initial intra coding mode using the intra mode subset, the initial intra coding mode used to code a residue for the block that is decoded to obtain the decoded intra prediction mode residue.

29. The method of claim 18, wherein the initial intra prediction mode is embedded in the spatial pattern.

30. The method of claim 29, wherein an embedding operation to embed the initial intra prediction mode in the spatial pattern is performed in a transform domain.

31. The method of claim 30, wherein the transformed and quantized difference is obtained by transforming and quantizing a difference between the original version of the block and the at least one reference block, and the initial intra prediction mode is embedded in the spatial pattern by modifying a quantized index of a transformed and quantized version of the difference between the original version of the block and the at least one reference block.

32. The method of claim 29, wherein the transformed and quantized difference is obtained by transforming and quantizing a difference between the original version of the block and the at least one reference block, and the initial intra prediction mode is embedded in the spatial pattern by modifying an amplitude of a transformed and un-quantized version of the difference between the original version of the block and the at least one reference block.

33. The method of claim 29, wherein an embedding operation to embed the initial intra prediction mode in the spatial pattern is performed in a spatial domain.

34. The method of claim 33, wherein the transformed and quantized difference is obtained by transforming and quantizing a difference between the original version of the block and the at least one reference block, and the initial intra prediction mode is embedded in the spatial pattern by modifying an amplitude of the difference between the original version of the block and the at least one reference block prior to the transforming and the quantizing.

35. An apparatus, comprising:
a video decoder for decoding picture data for at least a block in a picture by determining a spatial pattern for a decoded intra prediction mode residue used to reconstruct the picture at the video decoder, the decoded intra prediction mode residue obtained by inverse quantizing and inverse transforming a transformed and quantized difference between an original version of the block and at least one reference block,
wherein the spatial pattern is used to determine a most probable mode used to decode an intra prediction mode for decoding the block.

36. The apparatus of claim 35, wherein the most probable mode is determined from among a plurality of intra prediction modes.

37. The apparatus of claim 36, wherein the spatial pattern is used to determine the most probable mode by performing a spatial domain analysis of the spatial pattern.

38. The apparatus of claim 37, wherein the spatial domain analysis is based on at least one of gradients of residue pixels in the decoded intra prediction mode residue, pre-processing followed by gradient calculation, and a correlation calculated between the decoded intra prediction mode residue and a predefined directional block mask.

39. The apparatus of claim 36, wherein the spatial pattern is used to determine the most probable mode by performing a transform domain analysis of the spatial pattern.

40. The apparatus of claim 39, wherein a transform utilized in the transform domain analysis comprises at least one of a discrete cosine transform, an integer implementation of the discrete cosine transform, a Hadamard transform, and a wavelet transform.

41. The apparatus of claim 39, wherein the transform domain analysis is based on at least one of amplitudes and locations of significant transformed residue coefficients for the decoded intra prediction mode residue.

42. The apparatus of claim 36, wherein more than one method is used to select the most probable mode.

43. The apparatus of claim 42, wherein a selection of the most probable mode is explicitly received in a bitstream that includes the picture data for the block.

44. The apparatus of claim 35, wherein an intra mode subset is derived by analyzing the spatial pattern, the intra mode subset comprising less than all available intra prediction modes, the default set including all of the available intra prediction modes, and wherein a mode set is explicitly received in a bitstream that includes the picture data for the block, the mode set used to decode the intra prediction mode for decoding the block.

45. The apparatus of claim 35, wherein the decoder can infer the initial intra prediction mode from the spatial pattern of the decoded intra prediction residue.

46. In a video decoder, a method, comprising:
decoding picture data for at least a block in a picture by determining a spatial pattern for a decoded intra prediction mode residue used to reconstruct the picture at the video decoder, the decoded intra prediction mode residue obtained by inverse quantizing and inverse transforming a transformed and quantized difference between an original version of the block and at least one reference block,
wherein the spatial pattern is used to determine a most probable mode used to decode an intra prediction mode for decoding the block.

47. The method of claim 46, wherein the most probable mode is determined from among a plurality of intra prediction modes.

48. The method of claim 47, wherein the spatial pattern is used to determine the most probable mode by performing a spatial domain analysis of the spatial pattern.

49. The method of claim 48, wherein the spatial domain analysis is based on at least one of gradients of residue pixels in the decoded intra prediction mode residue, pre-processing followed by gradient calculation, and a correlation calculated between the decoded intra prediction mode residue and a predefined directional block mask.

50. The method of claim 47, wherein the spatial pattern is used to determine the most probable mode by performing a transform domain analysis of the spatial pattern.

51. The method of claim 50, wherein a transform utilized in the transform domain analysis comprises at least one of a discrete cosine transform, an integer implementation of the discrete cosine transform, a Hadamard transform, and a wavelet transform.

52. The method of claim 50, wherein the transform domain analysis is based on at least one of amplitudes and locations of significant transformed residue coefficients for the decoded intra prediction mode residue.

53. The method of claim 47, wherein more than one method is used to select the most probable mode.

54. The method of claim 53, wherein a selection of the most probable mode is explicitly received in a bitstream that includes the picture data for the block.

55. The method of claim 46, wherein an intra mode subset is derived by analyzing the spatial pattern, the intra mode subset comprising less than all available intra prediction modes, the default set including all of the available intra prediction modes, and wherein a mode set is explicitly received in a bitstream that includes the picture data for the block, the mode set used to decode the intra prediction mode for decoding the block.

56. The method of claim 46, wherein the decoder can infer the initial intra prediction mode from the spatial pattern of the decoded intra prediction residue.

57. A computer readable storage media having non-transitory video signal data encoded thereupon comprising:
picture data encoded for at least a block in a picture by determining a spatial pattern for a decoded intra prediction mode residue used to reconstruct the picture, the decoded intra prediction mode residue obtained by inverse quantizing and inverse transforming a transformed and quantized difference between an original version of the block and at least one reference block,
wherein the spatial pattern is used to determine a most probable mode used to encode an intra prediction mode for encoding the block.

* * * * *